(12) United States Patent
Davies et al.

(10) Patent No.: US 12,404,033 B2
(45) Date of Patent: Sep. 2, 2025

(54) THERMAL MANAGEMENT SYSTEM FOR AN AIRCRAFT

(71) Applicant: ROLLS-ROYCE PLC, London (GB)

(72) Inventors: Paul R Davies, Bristol (GB); Alexander T Joyce, Derby (GB); David A Jones, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/233,502

(22) Filed: Aug. 14, 2023

(65) Prior Publication Data
US 2024/0076053 A1    Mar. 7, 2024

(30) Foreign Application Priority Data
Sep. 6, 2022 (GB) .................................. 2212949

(51) Int. Cl.
*B64D 33/08* (2006.01)
*F02C 6/18* (2006.01)

(52) U.S. Cl.
CPC ............... *B64D 33/08* (2013.01); *F02C 6/18* (2013.01); *F05D 2260/20* (2013.01)

(58) Field of Classification Search
CPC ... B64D 33/08; F02C 6/18; F02C 7/12; F02C 7/14; F02C 7/16; F02C 7/18; F02C 7/222; F02C 7/224; F02C 7/32; F05D 2260/60; F05D 2260/213; F05D 2220/323
See application file for complete search history.

(56) References Cited

U.S. PATENT DOCUMENTS

| 5,615,547 A | 4/1997 | Beutin et al. |
| 6,292,763 B1 | 9/2001 | Dunbar et al. |
| (Continued) | | |

FOREIGN PATENT DOCUMENTS

| CN | 107989699 B | 9/2019 |
| CN | 111237085 A | 6/2020 |
| (Continued) | | |

OTHER PUBLICATIONS

Dec. 19, 2023 Office Action issued in U.S. Appl. No. 18/233,619.
(Continued)

*Primary Examiner* — Craig Kim
(74) *Attorney, Agent, or Firm* — Oliff PLC

(57) ABSTRACT

A thermal management system for an aircraft includes a first thermal bus including one or more first heat sources, a heat sink, a vapour compression system, and one or more second heat sources. The vapour compression system includes a compressor, a condenser, a receiver, a first side of a recuperator, an expansion valve, an evaporator, a second side of the recuperator, and the compressor. A first heat flow ($Q_1$) of waste heat energy generated by the first heat sources is transferred via the first heat transfer fluid to the heat sink. A second heat flow ($Q_2$) of waste heat energy generated by the second heat source(s) being transferred via the evaporator to a refrigerant. A third heat flow ($Q_3$) of heat energy in the refrigerant is transferred via the condenser to the first heat transfer fluid. The controller is configured to ensure that:

$1.1*Q_2 < Q_3 < 3.0*Q_2$.

10 Claims, 13 Drawing Sheets

(56) References Cited

U.S. PATENT DOCUMENTS

| | | | |
|---|---|---|---|
| 6,415,595 B1* | 7/2002 | Wilmot, Jr. | F02C 7/224 60/785 |
| 8,499,822 B2 | 8/2013 | Bulin et al. | |
| 9,334,802 B2 | 5/2016 | Papa et al. | |
| 10,082,104 B2 | 9/2018 | Apte | |
| 10,752,374 B1* | 8/2020 | Lui | B64D 13/08 |
| 10,823,066 B2 | 11/2020 | Miller et al. | |
| 10,876,497 B2 | 12/2020 | Munevar et al. | |
| 11,015,534 B2 | 5/2021 | Smith et al. | |
| 11,174,789 B2 | 11/2021 | Rambo et al. | |
| 11,187,156 B2 | 11/2021 | Niergarth et al. | |
| 11,273,925 B1* | 3/2022 | O'Meallie | F28D 15/025 |
| 11,492,969 B2 | 11/2022 | Bosak et al. | |
| 11,492,970 B2* | 11/2022 | Rambo | F02C 7/224 |
| 11,939,078 B1* | 3/2024 | Lui | B64D 37/34 |
| 11,952,945 B2* | 4/2024 | Davies | F02C 7/16 |
| 11,982,230 B2* | 5/2024 | Davies | F02C 7/16 |
| 12,031,488 B2* | 7/2024 | Hallisey | B64D 27/10 |
| 12,078,109 B2* | 9/2024 | Mochrie | F02C 7/236 |
| 2007/0266695 A1* | 11/2007 | Lui | B64D 13/06 60/204 |
| 2010/0043396 A1 | 2/2010 | Coffinberry | |
| 2010/0212857 A1 | 8/2010 | Bulin et al. | |
| 2011/0219786 A1* | 9/2011 | Andres | B64D 13/08 62/7 |
| 2011/0252764 A1 | 10/2011 | Smith | |
| 2011/0252796 A1 | 10/2011 | Burkhart | |
| 2012/0000205 A1 | 1/2012 | Coffinberry et al. | |
| 2012/0248242 A1 | 10/2012 | Gagne et al. | |
| 2013/0086909 A1 | 4/2013 | Wang et al. | |
| 2013/0098047 A1 | 4/2013 | Suciu et al. | |
| 2015/0192033 A1 | 7/2015 | Garassino et al. | |
| 2016/0160864 A1* | 6/2016 | Becquin | F04D 25/08 60/659 |
| 2016/0216053 A1 | 7/2016 | Storage et al. | |
| 2017/0030266 A1 | 2/2017 | Cerny et al. | |
| 2017/0067396 A1* | 3/2017 | Kustura | F25D 19/04 |
| 2017/0167382 A1 | 6/2017 | Miller et al. | |
| 2017/0217592 A1 | 8/2017 | Hinderliter | |
| 2017/0233083 A1 | 8/2017 | Behrens et al. | |
| 2017/0336149 A1 | 11/2017 | Ribarov et al. | |
| 2018/0094584 A1* | 4/2018 | Chalaud | F04C 23/005 |
| 2018/0229849 A1* | 8/2018 | Behrens | F02C 6/08 |
| 2019/0063321 A1 | 2/2019 | Morioka et al. | |
| 2019/0128570 A1 | 5/2019 | Moxon | |
| 2019/0153952 A1 | 5/2019 | Niergarth et al. | |
| 2019/0153953 A1 | 5/2019 | Niergarth et al. | |
| 2020/0108937 A1 | 4/2020 | Behrens et al. | |
| 2020/0123942 A1 | 4/2020 | Waddleton et al. | |
| 2020/0308992 A1 | 10/2020 | Juchymenko | |
| 2020/0332714 A1 | 10/2020 | Ribarov | |
| 2020/0332716 A1* | 10/2020 | Ribarov | F02C 7/224 |
| 2020/0355119 A1 | 11/2020 | Ribarov | |
| 2021/0071573 A1 | 3/2021 | Brookes et al. | |
| 2021/0122478 A1* | 4/2021 | Mackin | B64D 13/06 |
| 2021/0148283 A1 | 5/2021 | Niergarth et al. | |
| 2021/0156277 A1* | 5/2021 | Prasad | F25B 25/02 |
| 2021/0156597 A1* | 5/2021 | Bandhauer | F25B 6/04 |
| 2021/0172375 A1 | 6/2021 | Bosak et al. | |
| 2021/0270148 A1 | 9/2021 | Marchaj | |
| 2021/0340914 A1 | 11/2021 | Niergarth et al. | |
| 2022/0106052 A1 | 4/2022 | Snyder | |
| 2022/0112817 A1 | 4/2022 | Bradbrook et al. | |
| 2022/0112839 A1 | 4/2022 | Wong et al. | |
| 2022/0151102 A1 | 5/2022 | Snyder | |
| 2022/0194622 A1 | 6/2022 | Rambo et al. | |
| 2022/0252011 A1 | 8/2022 | Rambo et al. | |
| 2022/0275757 A1 | 9/2022 | Rambo et al. | |
| 2023/0349328 A1 | 11/2023 | Owoeye | |
| 2024/0280049 A1* | 8/2024 | Niergarth | F02C 7/185 |

FOREIGN PATENT DOCUMENTS

| | | | |
|---|---|---|---|
| CN | 114962004 A | | 8/2022 |
| EP | 2 527 252 A2 | | 11/2012 |
| EP | 3 124 770 A1 | | 2/2017 |
| EP | 3179074 A1 | | 6/2017 |
| EP | 3 730 763 A1 | | 10/2020 |
| EP | 3 754 161 A1 | | 12/2020 |
| EP | 3885550 A1 | | 9/2021 |
| FR | 2914365 A1 | | 10/2008 |
| GB | 2592466 A | | 9/2021 |
| GB | 2605673 A | | 10/2022 |
| WO | 2015/116260 A1 | | 8/2015 |

OTHER PUBLICATIONS

Dec. 22, 2023 Notice of Allowance issued in U.S. Appl. No. 18/233,518.

"18.5 Heat Exchangers," https://web.archive.org/web/20061128024159/ https://web.mit.edu/16.unified/www/FALL/thermodynamics/notes/node131.html (Year : 2010).

Aug. 13, 2024 U.S. Office Action issued in U.S. Appl. No. 18/233,531.

Mar. 6, 2023 Combined Search and Examination Report Issued In British Patent Application No. 2212947.2.

Mar. 7, 2023 Combined Search and Examination Report issued in British Patent Application No. 2212948.0.

Mar. 3, 2023 Search Report issued in British Patent Application No. 2212949.8.

Mar. 6, 2023 Search Report issued in British Patent Application No. 2212950.6.

Mar. 7, 2023 Combined Search and Examination Report issued in British Patent Application No. 2212951.4.

Mar. 7, 2023 Search Report issued in British Patent Application No. 2212952.2.

Mar. 7, 2023 Combined Search and Examination Report issued in British Patent Application No. 2212953.0.

Mar. 7, 2023 Combined Search and Examination Report issued in British Patent Application No. 2212954.8.

Feb. 10, 2023 Search Report issued in British Patent Application No. 2212955.5.

U.S. Appl. No. 18/233,533, filed Aug. 14, 2023 in the name of Davies et al.

U.S. Appl. No. 18/233,518, filed Aug. 14, 2023 in the name of Davies et al.

U.S. Appl. No. 18/233,495, filed Aug. 14, 2023 in the name of Davies et al.

U.S. Appl. No. 18/233,619, filed Aug. 14, 2023 in the name of Davies et al.

U.S. Appl. No. 18/233,607, filed Aug. 14, 2023 in the name of Joyce.

U.S. Appl. No. 18/233,531, filed Aug. 14, 2023 in the name of Davies et al.

U.S. Appl. No. 18/233,521, filed Aug. 14, 2023 in the name of Mochrie et al.

U.S. Appl. No. 18/233,510, filed Aug. 14, 2023 in the name of Davies et al.

U.S. Appl. No. 18/233,592, filed Aug. 14, 2023 in the name of Cole et al.

Jun. 21, 2024 Non-Final Rejection issued in U.S. Appl. No. 18/233,510.

Jul. 16, 2024 Office Action Issued in U.S. Appl. No. 18/233,607.

Jul. 22, 2024 Notice of Allowance received in U.S. Appl. No. 18/233,521.

Aug. 2, 2024 Supplemental Notice of Allowability issued in U.S. Appl. No. 18/233,521.

Jan. 29, 2024 Notice of Allowance issued U.S. Appl. No. 18/233,619.

Feb. 12, 2024 Extended European Search Report issued in European Patent Application No. 23190600.9.

Feb. 7, 2024 Extended European Search Report issued in European Patent Application No. 23190603.3.

Feb. 7, 2024 Extended European Search Report issued in European Patent Application No. 23190605.8.

Feb. 7, 2024 Extended European Search Report issued in European Patent Application No. 23190602.5.

(56) References Cited

OTHER PUBLICATIONS

Feb. 15, 2024 Extended European Search Report issued in European Patent Application No. 23190612.4.
Feb. 7, 2024 Extended European Search Report issued in European Patent Application No. 23190595.1.
Feb. 7, 2024 Extended European Search Report issued in European Patent Application No. 23190608.2.
Feb. 7, 2024 Extended European Search Report issued in European Patent Application No. 23190598.5.
Feb. 7, 2024 Extended European Search Report issued in European Patent Application No. 23190594.4.
Feb. 19, 2024 Extended European Search Report issued in European Patent Application No. 23190601.7.
Apr. 8, 2024 Office Action issued in U.S. Appl. No. 18/233,521.
Dec. 10, 2024 Office Action issued in U.S. Appl. No. 18/233,533.
Jan. 10, 2025 Notice of Allowance issued in U.S. Appl. No. 18/233,510.
Mar. 7, 2025 Notice of Allowance issued in U.S. Appl. No. 18/233,607.

* cited by examiner

THERMAL MANAGEMENT SYSTEM FOR AN AIRCRAFT

This disclosure claims the benefit of UK Patent Application No. GB 2212949.8, filed on 6 Sep. 2022, which is hereby incorporated herein in its entirety.

FIELD OF THE DISCLOSURE

The present disclosure relates to a thermal management system for an aircraft and particularly, but not exclusively, to a thermal management system for a gas turbine engine for an aircraft.

BACKGROUND TO THE DISCLOSURE

A conventional gas turbine engine for an aircraft includes sophisticated thermal management systems to control the temperatures of components. In particular, heat is rejected into the oil of the engine oil system used for cooling and lubricating engine components. The oil in the oil system is in turn cooled by transferring heat to engine fuel and/or air flows.

A further source of cooling demand can derive from the thermal management of electrical components, such as power electronics, which form an increasingly important part of aircraft and/or engine systems. Failure to meet increased cooling demands of electrical components can result in less reliable or decreased performance of such electrical systems. In particular, the performance and reliability of power electronics for powering aircraft and/or engine systems (e.g., the aircraft environmental control system) can be affected by temperature changes and therefore reliably controlling its temperature during all phases of aircraft operation is important.

Conventional heat management systems meet the power electronics' cooling demands during above-idle engine operation conditions by rejecting heat into engine fluid heat sinks, such as fuel flow to the engine combustor. However, during sub-idle engine operation conditions, which may for example occur at engine start-up, and also during post-shutdown heat soak back conditions, such heat sinks may be unavailable or insufficient to meet the cooling demands of the power electronics, if still active. Sub-idle engine operation conditions typically apply from 0 rpm to idle, which is the steady state engine operating condition with no load applied. Similar problems may also occur during post-shutdown heat soak back conditions.

Furthermore, during low-power conditions such as idle and descent, the rate of flow of fuel through the engine fuel system is reduced. Thus, continuing to transfer the heat produced by the oil system to the fuel system during those engine operation conditions can lead to high fuel temperature and the formation of solid fuel deposits (fuel lacquering/coking) e.g., inside engine fuel spray nozzles. Such deposits can impair the performance of the engine and might lead to component malfunctions and/or failures. The problem of high fuel temperature is exacerbated in lean burn fuel systems in which, to ensure margin against weak extinction during low-power operating conditions, the fuel system operates in pilot-only mode and stringent fuel temperature limits have to be imposed at the inlet of the fuel spray nozzles to avoid formation of deposits in the mains nozzle internal passages where stagnant fuel can be present.

A further problem of high fuel temperature can arise during deceleration manoeuvres (e.g., transition from end of cruise to top of descent) when the fuel flow is suddenly reduced, but due to the thermal inertia of the oil system, the heat load lags behind.

Statements of Disclosure

According to a first aspect of the present disclosure there is provided a thermal management system for an aircraft, the thermal management system comprising a first gas turbine engine, one or more first electric machines rotatably coupled to the first gas turbine engine, a first thermal bus, a first heat exchanger, and one or more first ancillary systems;

wherein the first thermal bus comprises a first heat transfer fluid, the first heat transfer fluid being in fluid communication, in a closed loop flow sequence, between the or each first electric machine, the first gas turbine engine, the first heat exchanger, and the or each first ancillary system, such that waste heat energy generated by at least one of the first gas turbine engine, the or each first electric machine, and the or each first ancillary system, is transferred to the first heat transfer fluid, and the first heat exchanger is configured to transfer the waste heat energy from the first heat transfer fluid to a dissipation medium.

The first thermal bus provides a thermal conduit between heat generating portions, such as a gas turbine engine, an electric machine, and an ancillary system, and heat dissipating portions, such as the heat exchanger. Consequently, waste heat energy generated by the gas turbine engine, electric machine and ancillary system can be transferred to the heat exchanger where it can be dissipated to a dissipation medium.

Examples of first ancillary system may include, for example, power converters for use with the electric machine, and the electrical control and thermal regulation of an energy storage system, for example battery or capacitive energy storage. Indeed, any aircraft-borne equipment or system that requires operation within pre-determined temperature limits, and which generates waste heat energy during its operation at a temperature greater than the temperature of the first heat transfer fluid, may be considered to be a first ancillary system.

Optionally, the first thermal bus is arranged in a recirculatory ring configuration with the first heat transfer fluid passing through each of the first gas turbine engine, the or each first electric machine, the first heat exchanger, and the or each first ancillary system.

By arranging the first thermal bus in a recirculatory closed loop configuration it is possible to continuously control a transfer of heat energy from regions of heat generation to regions of heat dissipation. This enables a user to control a working temperature for the regions of heat generation within desired pre-determined temperature limits. This makes the thermal management system of the disclosure more convenient and desirable for a user.

Optionally, the first gas turbine engine comprises, in axial flow sequence, a compressor module, a combustor module, and a turbine module, and the dissipation medium is an inlet air flow passing through the first heat exchanger and entering the compressor module.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the first gas turbine engine comprises, in axial flow sequence, a compressor module, a combustor module, and a turbine module, and the dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

Optionally, the first heat transfer fluid is a water/glycol mix.

The use of a water/glycol mixture as the first heat transfer fluid enables efficient waste heat energy transfer to the first heat transfer fluid. A water/glycol mixture is entirely non-flammable, which is advantageous for an aircraft application.

In one arrangement the glycol may be ethylene glycol. In other arrangements, the glycol may be propylene glycol or an alternative glycol formulation. The mixture ratio of the water/glycol mixture may be between 80% (w/w) water/20% (w/w) glycol, and 40% (w/w) water/60% (w/w) glycol.

Optionally, the thermal management system further comprises a vapour compression system, one or more second ancillary systems, and a second heat exchanger, and wherein waste heat energy generated by the or each second ancillary system is transferred to a second heat transfer fluid, the second heat exchanger is configured to transfer the waste heat energy from the second heat transfer fluid to the first heat transfer fluid, the first heat transfer fluid being in fluid communication, in a closed loop flow sequence, between the or each first electric machine, the first gas turbine engine, the first heat exchanger, the second heat exchanger, and the or each first ancillary system, and the vapour compression system is configured to increase a temperature of the second heat transfer fluid having passed through the or each second ancillary system to a value greater than a temperature of the first heat transfer fluid entering the second heat exchanger, such that waste heat energy generated by the or each second ancillary system can be transferred to the first heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

Optionally, the vapour compression system employs a vapour-compression cycle or an air-compression cycle.

Optionally, the first gas turbine engine is a first turbofan gas turbine engine, the turbofan gas turbine engine comprising, in axial flow sequence, a fan module, a compressor module, a combustor module, and a turbine module, the fan module comprising at least one fan stage having a plurality of fan blades extending radially from a hub, the plurality of fan blades defining a fan diameter ($D_{FAN}$), and wherein the fan diameter $D_{FAN}$ is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip diameter, measured across a centreline of the engine and between an outermost tip of opposing fan blades at their leading edge, may be in the range from 95 cm to 200 cm, for example in the range from 110 cm to 150 cm, or alternatively in the range from 155 cm to 200 cm. The fan tip diameter may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be greater than 160 cm.

The fan tip diameter may be in the range from 95 cm to 150 cm, optionally in the range from 110 cm to 150 cm, optionally in the range of from 110 cm to 145 cm, and further optionally in the range from 120 cm to 140 cm.

The fan tip diameter may be in the range from 155 cm to 200 cm, optionally in the range from 160 cm to 200 cm, and further optionally in the range from 165 cm to 190 cm.

Optionally, the first turbofan gas turbine engine further comprises an outer casing, the outer casing enclosing the sequential arrangement of fan assembly, compressor module, and turbine module, an annular bypass duct being defined between the outer casing and the sequential arrangement of compressor module and turbine module, a bypass ratio being defined as a ratio of a mass air flow rate through the bypass duct to a mass air flow rate through the sequential arrangement of compressor module and turbine module, and wherein the bypass ratio is less than 4.0.

A turbofan engine having a bypass ratio (BPR) of less than approximately 4.0 will have a generally smaller bypass duct (the annular duct surrounding the core gas turbine engine) than a turbofan engine having a BPR greater than approximately 4.0. For a turbofan engine with a BPR greater than, say, 4.0, the correspondingly larger bypass duct volume provides more scope for positioning a heat exchanger within the bypass duct than would be the case for a low BPR turbofan engine.

Optionally, the fan assembly has two or more fan stages, at least one of the fan stages comprising a plurality of fan blades defining the fan diameter $D_{FAN}$.

Providing the fan assembly with two or more fan stages enables the pressure ratio of the fan assembly to be increased without having to increase a fan diameter.

Optionally, the thermal management system further comprises a second gas turbine engine, one or more third electric machines rotatably coupled to the second gas turbine engine, a second thermal bus, a third heat exchanger, and one or more third ancillary systems;

wherein the second thermal bus comprises a third heat transfer fluid, the third heat transfer fluid being in fluid communication, in a closed loop flow sequence, between the second gas turbine engine, the or each second electric machine, the third heat exchanger, and the or each third ancillary system, such that waste heat energy generated by at least one of the second gas turbine engine, the or each second electric machine, and the or each third ancillary system, is transferred to the third heat transfer fluid, and the third heat exchanger is configured to transfer the waste heat energy from the third heat transfer fluid to a dissipation medium.

The thermal management system of the present disclosure can be used with an aircraft having two gas turbine engines, where each gas turbine engine is provided with a discrete thermal bus. Each thermal bus is then interfaced with a single vapour compression system in which waste heat energy generated by the or each second ancillary system can be 'lifted' in temperature and dissipated to the thermal bus associated with either or both gas turbine engine.

In an alternative arrangement, the aircraft may be provided with two gas turbine engines and having a single thermal bus linking both engines, their associated electric machine(s) and corresponding first ancillary system(s).

Optionally, the thermal management system further comprises a vapour compression system, one or more second ancillary systems, a second heat exchanger, and a fourth heat exchanger, and wherein waste heat energy generated by the or each second ancillary system is transferred to a second heat transfer fluid, the second heat exchanger is configured to transfer the waste heat energy from the second heat transfer fluid to the first heat transfer fluid, and the fourth heat exchanger is configured to transfer the waste heat energy from the second heat transfer fluid to the third heat transfer fluid, and the vapour compression system is configured to increase a temperature of the second heat transfer fluid having passed through the or each second ancillary system to a value greater than either or both of a temperature of the first heat transfer fluid entering the second heat exchanger and a temperature of the third heat transfer fluid entering the fourth heat exchanger, such that waste heat energy generated by the or each second ancillary system can be transferred to either or both of the first heat transfer fluid and the third heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

According to a further aspect of the present disclosure, there is provided a method of operating a thermal management system for an aircraft, the thermal management system comprising a first gas turbine engine, one or more first electric machines rotatably coupled to the first gas turbine engine, a first heat exchanger, and one or more first ancillary systems, the method comprising the steps of:

(i) providing a first thermal bus comprising a first heat transfer fluid with the first heat transfer fluid providing fluid communication, in a closed loop flow sequence, between the first gas turbine engine, the or each first electric machine, the first heat exchanger, and the or each first ancillary system;

(ii) transferring a waste heat energy generated by at least one of the first gas turbine engine, the or each first electric machine, and the or each first ancillary system, to the first heat transfer fluid; and (iii) transferring the waste heat energy from the first heat transfer fluid to a dissipation medium.

The first thermal bus provides a thermal conduit between heat generating portions, such as a gas turbine engine, an electric machine, and an ancillary system, and heat dissipating portions, such as the heat exchanger. Consequently, waste heat energy generated by the gas turbine engine, electric machine and ancillary system can be transferred to the heat exchanger where it can be dissipated to a dissipation medium.

Examples of first ancillary system may include, for example, power converters for use with the electric machine, and the electrical control and thermal regulation of an energy storage system, for example battery or capacitive energy storage. Indeed, any aircraft-borne equipment or system that requires operation within pre-determined temperature limits, and which generates waste heat energy during its operation at a temperature greater than the temperature of the first heat transfer fluid, may be considered to be a first ancillary system.

Optionally, the first thermal bus is arranged in a recirculatory ring configuration with the first heat transfer fluid passing through each of the first gas turbine engine, the or each first electric machine, the first heat exchanger, and the or each first ancillary system.

By arranging the first thermal bus in a recirculatory closed loop configuration it is possible to continuously control a transfer of heat energy from regions of heat generation to regions of heat dissipation. This enables a user to control a working temperature for the regions of heat generation within desired pre-determined temperature limits. This makes the thermal management system of the disclosure more convenient and desirable for a user.

Optionally, the first gas turbine engine comprises, in axial flow sequence, a compressor module, a combustor module, and a turbine module, and the dissipation medium is an inlet air flow passing through the first heat exchanger and entering the compressor module.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the first gas turbine engine comprises, in axial flow sequence, a compressor module, a combustor module, and a turbine module, and the dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

Optionally, the first heat transfer fluid is a water/glycol mix.

The use of a water/glycol mixture as the first heat transfer fluid enables efficient waste heat energy transfer to the first heat transfer fluid. A water/glycol mixture is entirely non-flammable, which is advantageous for an aircraft application.

In one arrangement the glycol may be ethylene glycol. In other arrangements, the glycol may be propylene glycol or an alternative glycol formulation. The mixture ratio of the water/glycol mixture may be between 80% (w/w) water/20% (w/w) glycol, and 40% (w/w) water/60% (w/w) glycol.

Optionally, the thermal management system further comprises a vapour compression system, one or more second ancillary systems, and a second heat exchanger, and wherein waste heat energy generated by the or each second ancillary system is transferred to a second heat transfer fluid, the second heat exchanger is configured to transfer the waste heat energy from the second heat transfer fluid to the first heat transfer fluid, and the vapour compression system is configured to increase a temperature of the second heat transfer fluid having passed through the or each second ancillary system to a value greater than a temperature of the first heat transfer fluid entering the second heat exchanger, such that waste heat energy generated by the or each second ancillary system can be transferred to the first heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

According to a further aspect of the present disclosure there is provided a thermal management system for an aircraft, the thermal management system comprising a first gas turbine engine, a first thermal bus, a first heat exchanger one or more first ancillary systems, a vapour compression system, one or more second ancillary systems and a second heat exchanger, wherein the first thermal bus comprises a first heat transfer fluid, the first heat transfer fluid being in fluid communication between the first gas turbine engine, the first heat exchanger, and the or each first ancillary system, such that a waste heat energy generated by at least one of the first gas turbine engine, and the or each first ancillary system, is transferred to the first heat transfer fluid, and wherein a waste heat energy generated by the or each second ancillary system is transferred to a second heat transfer fluid, the second heat exchanger is configured to transfer the waste heat energy from the second heat transfer fluid to the first heat transfer fluid, and the vapour compression system is configured to increase a temperature of the second heat transfer fluid having passed through the or each second ancillary system to a value greater than a temperature of the first heat transfer fluid entering the second heat exchanger, such that waste heat energy generated by the or each second ancillary system can be transferred to the first heat transfer fluid, and the first heat exchanger is configured to transfer the waste heat energy from the first heat transfer fluid to a dissipation medium, and wherein the waste heat energy transferred to the second heat transfer fluid is in a range of from 10 kW to 200 kW.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

By dissipating the waste heat energy generated by the or each second ancillary system via the vapour compression system to the first heat transfer fluid and then to a dissipation medium, it possible for the aircraft to dissipate low temperature waste heat energy without requiring supplementary cooling air inlet and exhaust ducts on the airframe. This enables the aircraft to be aerodynamically more efficient and thus more desirable to a user.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

Optionally, a ratio of a maximum waste heat energy generated by the or each second ancillary system to a minimum waste heat energy generated by the or each second ancillary system is in a range of between 5 and 20.

This enables the thermal management system of the present disclosure to effectively dissipate a wide range of waste heat energy inputs generated by the or each second ancillary system.

Optionally, a temperature of the first heat transfer fluid entering the second heat exchanger is at least 100° C.

The vapour compression system increases a temperature of the refrigerant to a temperature that is greater than 100° C. so that the waste heat energy generated by the second ancillary systems can be dissipated to the first heat transfer fluid and then to the dissipation medium.

Optionally, the thermal management system further comprises one or more first electric machines rotatably coupled to the first gas turbine engine, the first heat transfer fluid providing fluid communication between the first gas turbine engine, the or each first electric machine, the first heat exchanger, and the or each first ancillary system, such that waste heat energy generated by at least one of the first gas turbine engine, the or each first electric machine, and the or each first ancillary system, is transferred to the first heat transfer fluid.

The or each first electric machine may be an electric motor or may be an electric generator or may be an electric motor/generator. The electric machine may provide a starting capability to the gas turbine engine. The electric machine may be used to motor or brake one or more of the spools of the gas turbine engine to optimise an engine performance characteristic of the gas turbine engine.

Optionally, the first gas turbine engine comprises, in axial flow sequence, a compressor module, a combustor module, and a turbine module, and the dissipation medium is an inlet air flow passing through the first heat exchanger and entering the compressor module.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the first gas turbine engine comprises, in axial flow sequence, a compressor module, a combustor module, and a turbine module, and the dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

According to a further aspect of the present disclosure, there is provided a method of operating a thermal management system for an aircraft, the thermal management system comprising a first gas turbine engine, a first heat exchanger, one or more first ancillary systems, one or more second ancillary systems, and a second heat exchanger;
wherein the method comprises the steps of:
(i) providing a first thermal bus comprising a first heat transfer fluid with the first heat transfer fluid providing fluid communication, in a closed loop flow sequence, between the first gas turbine engine, the first heat exchanger, and the or each first ancillary system;
(ii) transferring a waste heat energy generated by at least one of the first gas turbine engine, and the or each first ancillary system, to the first heat transfer fluid;
(iii) transferring a waste heat energy generated by the or each second ancillary system, being in a range of between 10 KW and 200 kW, to a second heat transfer fluid;
(iv) transferring a waste heat energy from the second heat transfer fluid to the first heat transfer fluid, using the second heat exchanger;
(v) providing a vapour compression system to increase a temperature of the second heat transfer fluid having passed through the or each second ancillary system to a value greater than a temperature of the first heat transfer fluid entering the second heat exchanger; and
(vi) transferring the waste heat energy from the first heat transfer fluid to a dissipation medium, using the first heat exchanger.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

By dissipating the waste heat energy generated by the or each second ancillary system via the vapour compression system to the first heat transfer fluid and then to a dissipation medium, it possible for the aircraft to dissipate low temperature waste heat energy without requiring supplementary cooling air inlet and exhaust ducts on the airframe. This enables the aircraft to be aerodynamically more efficient and thus more desirable to a user.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

According to a further aspect of the present disclosure there is provided a thermal management system for an aircraft, the thermal management system comprising a first thermal bus, the first thermal bus comprising, in a closed loop flow sequence, one or more first heat sources, a heat sink, a vapour compression system, and one or more second heat sources, and
wherein the vapour compression system comprises, in closed loop flow sequence, a compressor, a condenser, a receiver, a first side of a recuperator, an expansion valve, an evaporator, a second side of the recuperator, and the compressor, each of the compressor and the expansion valve being controlled by a controller, wherein the first thermal bus comprises a first heat transfer fluid, and a first heat flow ($Q_1$) of waste heat energy generated by the first heat sources is transferred via the first heat transfer fluid to the heat sink, and
wherein the vapour compression system comprises a refrigerant fluid, a second heat flow ($Q_2$) of waste heat energy generated by the or each second heat source is transferred via the evaporator to the refrigerant, and a third heat flow ($Q_3$) of heat energy in the refrigerant is transferred via the condenser to the first heat transfer fluid, and the controller is configured to ensure that:

$$1.1*Q_2 < Q_3 < 3.0*Q_2.$$

The vapour compression system may be controlled to accept a range of waste heat energy inputs from the second heat source(s) while increasing a temperature of this waste heat energy so that it can be subsequently transferred to the first heat transfer fluid.

Optionally, the thermal management system further comprises one or more first electric machines rotatably coupled to the first gas turbine engine, the first heat transfer fluid being in fluid communication between the first gas turbine engine, the or each first electric machine, the first heat exchanger, and the or each first ancillary system, such that waste heat energy generated by at least one of the first gas turbine engine, the or each first electric machine, and the or each first ancillary system, is transferred to the first heat transfer fluid.

The or each first electric machine may be an electric motor or may be an electric generator or may be an electric motor/generator. The electric machine may provide a starting capability to the gas turbine engine. The electric machine may be used to motor or brake one or more of the spools of the gas turbine engine to optimise an engine performance characteristic of the gas turbine engine.

Optionally, the heat sink comprises a first heat exchanger, and the first gas turbine engine comprises, in axial flow sequence, the first heat exchanger, a compressor module, a combustor module, and a turbine module, and the dissipation medium is an inlet air flow passing through the first heat exchanger and entering the compressor module.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the heat sink comprises a first heat exchanger, and the first gas turbine engine comprises, in axial flow sequence, a compressor module, a combustor module, and a turbine module, and the dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

Optionally, the vapour compression system further comprises, between the first side of the recuperator and the second side of the recuperator, two or more parallel flow lines with each flow line comprising, in axial flow sequence, an expansion valve and an evaporator, and wherein each evaporator is configured to transfer a heat flow ($Q_2$) of waste heat energy generated by a corresponding second heat source to the refrigerant.

The use of two or more parallel flow lines, each flow line comprising, in axial flow sequence, an expansion valve and an evaporator, enables each flow line to be optimised for the transfer of waste heat energy from a corresponding second heat source at a different temperature. This means that waste heat energy can be efficiently transferred from a range of second heat sources to the refrigerant and thence to the first heat transfer fluid (via the condenser) and finally to the dissipation medium. This improves an overall efficiency of the thermal management system so making it more desirable for a user.

According to a further aspect of the present disclosure, there is provided a method of operating a thermal management system for an aircraft, the thermal management system comprising a first thermal bus, the first thermal bus comprising, in a closed loop flow sequence, one or more first heat sources, a heat sink, a vapour compression system, and one or more second heat sources, the method comprising the steps of:
  (i) providing a vapour compression system comprising, in closed loop flow sequence, a compressor, a condenser, a receiver, a first side of a recuperator, an expansion valve, an evaporator, a second side of the recuperator, and the compressor;
  (ii) providing the vapour compression system with a refrigerant fluid;
  (iii) providing a controller configured to control each of the compressor and the expansion valve;
  (iv) transferring a first heat flow ($Q_1$) of waste heat energy generated by at least one of the first heat sources, to the first heat transfer fluid;
  (v) transferring a second heat flow ($Q_2$) of waste heat energy generated by the or each second heat source is transferred via the evaporator to the refrigerant
  (vi) transferring a third heat flow ($Q_3$) of heat energy in the refrigerant generated by the or each second heat source is transferred via the condenser to the first heat transfer fluid;
  (vii) controlling each of the compressor and the expansion valve such that:

$1.1*Q_2<Q_3<3.0*Q_2$; and (viii) transferring the waste heat energy from the first heat transfer fluid to a dissipation medium.

The vapour compression system may be controlled to accept a range of waste heat energy inputs from the second heat source(s) while increasing a temperature of this waste heat energy so that it can be subsequently transferred to the first heat transfer fluid.

According to a further aspect of the present disclosure there is provided a thermal management system for an aircraft, the thermal management system comprising a first thermal bus, the first thermal bus comprising, in a closed loop flow sequence, one or more first heat sources, a heat sink, a vapour compression system, and one or more second heat sources, and wherein the vapour compression system comprises, in closed loop flow sequence, a compressor, a condenser, a receiver, a first side of a recuperator, an expansion valve, an evaporator, a second side of the recuperator, and the compressor, each of the compressor and the expansion valve being controlled by a controller,
  wherein the first thermal bus comprises a first heat transfer fluid, a first heat flow ($Q_1$) of waste heat energy generated by the first heat sources is transferred via the first heat transfer fluid to the heat sink, and
  wherein the vapour compression system comprises a refrigerant fluid, a second heat flow ($Q_2$) of waste heat energy generated by the or each second heat source is transferred via the evaporator to the refrigerant, and a third heat flow ($Q_3$) of heat energy in the refrigerant is transferred via the condenser to the first heat transfer fluid, and the compressor is provided with a supplementary reservoir of refrigerant fluid, the supplementary reservoir being configured to increase the volume of the refrigerant fluid in the vapour compression system during operation when a temperature of the first heat transfer fluid is equal to or less than a temperature of the or each second heat source.

The thermal management system of the present arrangement provides an alternative solution to operation of the thermal management system on a cold day. This arrangement enables the transfer of heat energy via the vapour compression system even when no temperature uplift is required. In other words, when a temperature of the first thermal bus is equal to or less than a temperature of the waste heat energy of the second ancillary systems.

The default operating state of the vapour compression system uses the reverse-Rankine cycle (or a modified cycle) to move heat from a lower temperature to a higher temperature (#1). The pressure ratio of the cycle corresponds to the 'thermal lift' provided.

In a system where the heat sink temperature is reducing, the pressure ratio required will drop (#2). In some systems the temperature of the heat sink may reduce below the cooling temperature requirement. In this scenario no thermal lift is required (as heat energy can be dissipated passively) and the vapour compression system is unable to operate as normal.

As a result, the vapour compression system may need to be bypassed in order to ensure the vapour compression system consumer(s) are still cooled.

According to a further aspect of the present disclosure, there is provided a method of operating a thermal management system for an aircraft, the thermal management system comprising a first thermal bus, the first thermal bus comprising, in a closed loop flow sequence, one or more first heat sources, a heat sink, a vapour compression system, and one or more second heat sources, the method comprising the steps of:
  (i) providing a vapour compression system comprising, in closed loop flow sequence, a compressor, a condenser, a receiver, a first side of a recuperator, an expansion valve, an evaporator, a second side of the recuperator, and the compressor;
  (ii) providing the vapour compression system with a refrigerant fluid;
  (iii) providing a controller configured to control each of the compressor and the expansion valve;
  (iiii) operating the expansion valve to a fully open condition;
  (iiii) increasing a volume of refrigerant in the vapour compression system closed loop;
  (iv) transferring a first heat flow ($Q_1$) of waste heat energy generated by at least one of the first heat sources, to the first heat transfer fluid;
  (v) transferring a second heat flow ($Q_2$) of waste heat energy generated by the or each second heat source is transferred via the evaporator to the refrigerant
  (vi) transferring a third heat flow ($Q_3$) of heat energy in the refrigerant generated by the or each second heat source is transferred via the condenser to the first heat transfer fluid; and
  (vii) transferring the waste heat energy from the first heat transfer fluid to a dissipation medium.

The thermal management system of the present arrangement provides an alternative solution to operation of the thermal management system on a cold day. This arrangement enables the transfer of heat energy via the vapour compression system even when no temperature uplift is required. In other words, when a temperature of the first thermal bus is equal to or less than a temperature of the waste heat energy of the second ancillary systems.

According to a further aspect of the present disclosure there is provided a thermal management system for an aircraft, the thermal management system comprising a first gas turbine engine, one or more first electric machines rotatably coupled to the first gas turbine engine, a first thermal bus, and a first heat exchanger;
  wherein the first thermal bus comprises a first heat transfer fluid, the first heat transfer fluid being in fluid communication, in a closed loop flow sequence, between the first gas turbine engine, the or each first electric machine, and the first heat exchanger, such that waste heat energy generated by at least one of the first gas turbine engine, and the or each first electric machine, is transferred to the first heat transfer fluid, and
  wherein when an airspeed of the aircraft is less than Mn0.6, the first heat exchanger is configured to transfer the waste heat energy from the first heat transfer fluid to a first dissipation medium, and when the airspeed of the aircraft is greater than Mn0.6, the first heat exchanger is configured to transfer the waste heat energy from the first heat transfer fluid to a second dissipation medium.

When the airspeed of the aircraft is less than Mn0.6 the first heat transfer fluid is circulated through a first dissipation medium in the heat exchanger and waste heat energy from the first heat transfer fluid is rejected to the first dissipation medium. However, when the airspeed of the aircraft is greater than Mn0.6 the first heat transfer fluid is circulated through a second dissipation medium in the heat exchanger and waste heat energy from the first heat transfer fluid is rejected to the second dissipation medium.

Optionally, the first gas turbine engine comprises, in axial flow sequence, the first heat exchanger, a compressor module, a combustor module, and a turbine module, and the first dissipation medium is an inlet air flow passing through the first heat exchanger.

When the airspeed of the aircraft is less than Mn0.6, the waste heat energy can be effectively transferred from the first heat transfer fluid to the air flow passing through the first heat exchanger. For example, at a sustained airspeed of Mn0.6 the incoming airflow may have a temperature of approximately 55° C., while the first heat transfer fluid may typically have a temperature of approximately 150° C.

However, when the sustained airspeed increases, for example towards sonic and then to a supersonic level, the temperature of the first dissipation medium increases above the ambient air temperature. This is because the air flow must be slowed to a subsonic level as it enters the inlet to the gas turbine engine. In the process of slowing the air flow its temperature increases because of the viscous losses caused in slowing the air flow.

The temperature of the airflow may therefore be greater than the temperature of the first fluid, which makes it impossible to reject waste heat energy from the first heat transfer fluid to the airflow passing through the heat exchanger.

Optionally, the first gas turbine engine comprises, in axial flow sequence, a compressor module, a combustor module, and a turbine module, and the second dissipation medium is a fuel flow passing through the first heat exchanger and subsequently being directed to the combustor module.

At a high sustained airspeed, for example approaching sonic or greater, the waste heat energy can be effectively transferred from the first heat transfer fluid to a fuel flow that is subsequently circulated to the gas turbine engine. The temperature of the fuel is greater than the temperature of the ambient air that would enter the turbofan engine at a low sustained airspeed, for example less at Mn0.6, but is less than the temperature of the air flow entering the turbofan engine at a high sustained airspeed, for example greater than Mn1.0.

Optionally, after passing through the first heat exchanger, the fuel flow is returned to a main fuel tank if the airspeed of the aircraft is less than Mn0.6, otherwise the fuel flow is returned to a collector tank if the airspeed of the aircraft is greater than Mn0.6.

If the airspeed of the aircraft is less than Mn0.6 then the fuel flow rate is relatively low and the waste heat energy can be readily transferred to the bulk fuel capacity of the main fuel tank. If the airspeed of the aircraft is greater than Mn0.6 then the fuel flow rate is relatively high and the waste heat energy can more efficiently be transferred to the fuel as it is temporarily stored in the collector tank.

Optionally, the thermal management system further comprises one or more first ancillary systems that generate waste heat energy that is transferred to the first heat transfer fluid.

Examples of first ancillary system may include, for example, power converters for use with the electric machine, and the electrical control and thermal regulation of an energy storage system, for example battery or capacitive energy storage. Indeed, any aircraft-borne equipment or system that requires operation within pre-determined temperature limits, and which generates waste heat energy during its operation at a temperature greater than the temperature of the first heat transfer fluid, may be considered to be a first ancillary system.

Optionally, the thermal management system further comprises a vapour compression system, one or more second ancillary systems, and a second heat exchanger, and wherein waste heat energy generated by the or each second ancillary system is transferred to a second heat transfer fluid, the second heat exchanger is configured to transfer the waste heat energy from the second heat transfer fluid to the first heat transfer fluid, and the vapour compression system is configured to increase a temperature of the second heat transfer fluid having passed through the or each second ancillary system to a value greater than a temperature of the first heat transfer fluid entering the second heat exchanger, such that waste heat energy generated by the or each second ancillary system can be transferred to the first heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

According to a further aspect of the present disclosure, there is provided a method of operating a thermal management system for an aircraft, the thermal management system comprising a first gas turbine engine, one or more first electric machines rotatably coupled to the first gas turbine engine, a first heat exchanger, and one or more first ancillary systems, the method comprising the steps of:
(i) providing a first thermal bus comprising a first heat transfer fluid with the first heat transfer fluid providing fluid communication, in a closed loop flow sequence, between the first gas turbine engine, the or each first electric machine, the first heat exchanger, and the or each first ancillary system;
(ii) transferring a waste heat energy generated by at least one of the first gas turbine engine, the or each first electric machine, and the or each first ancillary system, to the first heat transfer fluid;
(iii) if an airspeed of the aircraft is less than Mn0.6, transferring the waste heat energy from the first heat transfer fluid to a first dissipation medium; and
(iv) if an airspeed of the aircraft is greater than Mn0.6, transferring the waste heat energy from the first heat transfer fluid to a second dissipation medium.

When the airspeed of the aircraft is less than Mn0.6 the first heat transfer fluid is circulated through a first dissipation medium in the heat exchanger and waste heat energy from the first heat transfer fluid is rejected to the first dissipation medium. However, when the airspeed of the aircraft is greater than Mn0.6 the first heat transfer fluid is circulated through a second dissipation medium in the heat exchanger and waste heat energy from the first heat transfer fluid is rejected to the second dissipation medium.

Optionally, the thermal management system comprises one or more second ancillary systems, and method step (i) comprises the following subsequent steps:
(i-a) providing a vapour compression system comprising, in closed loop flow sequence, a compressor, a condenser, a receiver, a first side of a recuperator, an expansion valve, an evaporator, a second side of the recuperator, and the compressor;
(i-b) providing the vapour compression system with a refrigerant fluid;
(i-c) providing a controller configured to control each of the compressor and the expansion valve;
(i-d) transferring a waste heat energy generated by the or each second ancillary systems to the refrigerant; and
(i-e) operating the vapour compression system to increase a temperature of the refrigerant to enable a transfer of the heat energy from the refrigerant to the first heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

According to a further aspect of the present disclosure there is provided a thermal management system for an aircraft, the thermal management system comprising a first gas turbine engine, one or more first electric machines rotatably coupled to the first gas turbine engine, a first thermal bus, and a first heat exchanger;
wherein the first thermal bus comprises a first heat transfer fluid, the first heat transfer fluid being in fluid communication, in a closed loop flow sequence, between the first gas turbine engine, the or each first electric machine, and the first heat exchanger, such that waste heat energy generated by at least one of the first gas turbine engine, and the or each first electric machine, is transferred to the first heat transfer fluid, and
wherein the first heat exchanger is configured to direct a first proportion of the flow of the first heat transfer fluid through a first heat dissipation portion in which a first proportion $Q_A$ of the waste heat energy from the first heat transfer fluid is transferred to a first dissipation medium in dependence on a temperature of the first dissipation medium and a mass flow rate of the first dissipation medium, and a second proportion of the flow of the first heat transfer fluid through a second heat dissipation portion in which a second proportion $Q_B$ of the waste heat energy from the first heat transfer fluid is transferred to a second dissipation medium in dependence on a temperature of the second dissipation medium and a mass flow rate of the second dissipation medium.

In the thermal management system of the present disclosure, the first heat exchanger is configured to control a flow of the first heat transfer fluid between the first dissipation portion and the second dissipation portion depending upon the corresponding temperature and mass flow rate of the first dissipation portion and the second dissipation portion to maximise the dissipation of waste heat energy from the first heat transfer fluid.

In another arrangement, the control and split of the flow of the first heat transfer fluid between the first dissipation portion and the second dissipation portion may be dependent only on a corresponding temperature of the first dissipation portion and the second dissipation portion.

Optionally, the first heat exchanger is configured to direct a first proportion of the flow of the first heat transfer fluid through a first heat dissipation portion in which a first proportion $Q_A$ of the waste heat energy from the first heat transfer fluid is transferred to a first dissipation medium in dependence on a first temperature differential between a temperature of the first heat transfer fluid and a temperature of the first dissipation medium.

The first temperature differential is the temperature between the first thermal bus fluid and the temperature of the inlet air flow entering the gas turbine engine. This differential must be above a minimum value in order for efficient heat energy transfer to take place.

Optionally, the first temperature differential is preferably at least 10° C., and more preferably at least 5° C.

In one arrangement, the first temperature differential is 15° C., which ensures that effective transfer of the waste heat energy can take place between the first heat transfer fluid and the first dissipation medium.

Optionally, the first heat exchanger comprises a bypass flow path, and wherein the first heat exchanger is configured to direct a third proportion of the flow of the first heat transfer fluid through the bypass flow path in dependence on a temperature of the first heat transfer fluid.

In this arrangement, the first heat exchanger is configured to control a flow of the first heat transfer fluid between the first dissipation portion, the second dissipation portion, and a bypass flow path depending upon the corresponding temperature and mass flow rate of the first dissipation portion, and the second dissipation portion, and a temperature of the first heat transfer fluid, in order to maximise the dissipation of the waste heat energy from the first heat transfer fluid.

The inclusion of the bypass flow path ensures that the thermal management system avoids a situation in which directing the first heat transfer fluid through either of the first dissipation portion or the second dissipation portion would excessively lower a temperature of the first heat transfer fluid such that it could not effectively accept waste heat energy.

Optionally, the first gas turbine engine comprises, in axial flow sequence, the first heat exchanger, a compressor module, a combustor module, and a turbine module, and the first dissipation medium is an inlet air flow passing through the first heat exchanger.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the first gas turbine engine comprises, in axial flow sequence, a compressor module, a combustor module, and a turbine module, and the second dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

According to a further aspect of the present disclosure, there is provided a method of operating a thermal management system for an aircraft, the thermal management system comprising a first gas turbine engine, one or more first electric machines rotatably coupled to the first gas turbine engine, and a first heat exchanger, the method comprising the steps of:

(i) providing a first thermal bus comprising a first heat transfer fluid with the first heat transfer fluid providing fluid communication, in a closed loop flow sequence, between the first gas turbine engine, the or each first electric machine, and the first heat exchanger;

(ii) directing a first proportion of the flow of the first heat transfer fluid through a first heat dissipation portion in which a first proportion $Q_A$ of the waste heat energy from the first heat transfer fluid is transferred to a first dissipation medium in dependence on a temperature of the first dissipation medium and a mass flow rate of the first dissipation medium; and (iii) directing a second proportion of the flow of the first heat transfer fluid through a second heat dissipation portion in which a second proportion $Q_B$ of the waste heat energy from the first heat transfer fluid is transferred to a second dissipation medium in dependence on a temperature of the second dissipation medium and a mass flow rate of the second dissipation medium.

In the thermal management system of the present disclosure, the first heat exchanger is configured to control a flow of the first heat transfer fluid between the first dissipation portion and the second dissipation portion depending upon the corresponding temperature and mass flow rate of the first dissipation portion and the second dissipation portion to maximise the dissipation of waste heat energy from the first heat transfer fluid.

In another arrangement, the control and split of the flow of the first heat transfer fluid between the first dissipation portion and the second dissipation portion may be dependent only on a corresponding temperature of the first dissipation portion and the second dissipation portion.

Optionally, the method comprises the further step of:

(iv) directing a third proportion of the flow of the first heat transfer fluid through a bypass flow path in dependence on a temperature of the first heat transfer fluid.

In this arrangement, the first heat exchanger is configured to control a flow of the first heat transfer fluid between the first dissipation portion, the second dissipation portion, and a bypass flow path depending upon the corresponding temperature and mass flow rate of the first dissipation portion, and the second dissipation portion, and a temperature of the first heat transfer fluid, in order to maximise the dissipation of the waste heat energy from the first heat transfer fluid.

The inclusion of the bypass flow path ensures that the thermal management system avoids a situation in which directing the first heat transfer fluid through either of the first dissipation portion or the second dissipation portion would excessively lower a temperature of the first heat transfer fluid such that it could not effectively accept waste heat energy.

According to a further aspect of the present disclosure there is provided a thermal management system for an aircraft, the thermal management system comprising a first gas turbine engine, one or more first electric machines rotatably coupled to the first gas turbine engine, a first thermal bus, and a first heat exchanger module;

wherein the first thermal bus comprises a first heat transfer fluid, the first heat transfer fluid being in fluid communication, in a closed loop flow sequence, between the first gas turbine engine, the or each first electric machine, and the first heat exchanger, such that waste heat energy generated by at least one of the first gas turbine engine, and the or each first electric machine, is transferred to the first heat transfer fluid, and wherein the first heat exchanger module comprises a first flow path and a second flow path, the first flow path being configured to direct a flow of the first heat transfer fluid either to a first heat dissipation portion in which a first proportion $Q_A$ of the waste heat energy from the first heat transfer fluid is transferred to a first dissipation medium, or additionally to a second heat dissipation portion in which a second proportion $Q_B$ of the waste heat energy from the first heat transfer fluid is transferred to a second dissipation medium, in dependence on a temperature of the first heat transfer fluid entering the first heat exchanger module, a temperature of the first heat dissipation medium, and a temperature of the second heat dissipation medium, the second flow path being configured to direct the flow of the first heat transfer fluid to a second heat dissipation portion in which a second proportion $Q_B$ of the waste heat energy from the first heat transfer fluid is transferred to a second dissipation medium, or additionally to the first heat dissipation portion in which a first proportion $Q_A$ of the waste heat energy from the first heat transfer fluid is transferred to a first dissipation medium, in dependence on a temperature of the first heat transfer fluid entering the first heat exchanger module, a temperature of the first heat dissipation medium, and a temperature of the second heat dissipation medium, The heat exchanger module comprises two flow paths, each of which comprises a corresponding heat dissipation portion. These flow paths are arranged in a parallel configuration with the first heat transfer fluid being able to be directed through either flow path. In addition, the heat exchanger module also includes two cross-over flow paths, with each cross-over path extending from an inlet of one of the heat dissipation portions to an outlet from the other of the heat dissipation portions. Each of the cross-over paths includes corresponding solenoid isolator and diverter valves at their junctions with the two main flow paths.

In this way, a flow entering the heat exchanger module can be directed through only one or other of the flow paths and thus through only one or other of the corresponding heat dissipation portions. Alternatively, by actuating the appropriate solenoid isolator and diverter valves, a flow entering the heat exchanger module can be directed first through one of the flow paths and the corresponding heat dissipation portion, and second through the other of the flow paths and the other of the corresponding heat dissipation portions.

In the arrangement where the flow entering the heat exchanger module passes sequentially through each of the flow paths and the corresponding heat dissipation portions, an appropriate selection of valve position enables the flow to pass through the two flow paths and heat dissipation portions in either order.

In this way, the first heat transfer fluid can be directed through any combination of the first heat dissipation portion, and the second heat dissipation portion, either alone or in combination. The selection of the flow sequence through the heat exchanger module is made on the basis of the temperatures of the corresponding first heat dissipation medium and the second heat dissipation medium in order to optimise the quantity of waste heat energy that can be rejected to the corresponding heat dissipation medium.

Optionally, the first gas turbine engine comprises, in axial flow sequence, a compressor module, a combustor module, and a turbine module, and the first dissipation medium is an inlet air flow passing through the first heat exchanger and entering the compressor module.

In this arrangement, the first dissipation medium is an inlet air flow entering the gas turbine engine, with the waste heat energy being rejected to the inlet air flow immediately prior to the air flow entering the gas turbine engine.

Optionally, the first gas turbine engine comprises, in axial flow sequence, a compressor module, a combustor module, and a turbine module, and the second dissipation medium is a fuel flow passing through the first heat exchanger and subsequently being directed to the combustor module.

In this arrangement, the second dissipation medium is a fuel flow feeding the gas turbine engine, with the waste heat energy being rejected to the fuel flow prior to the fuel being combusted in the gas turbine engine.

Optionally, a non-return valve is provided between the first heat dissipation portion and the corresponding additional second heat dissipation portion, and between the second heat dissipation portion and the corresponding additional first heat dissipation portion.

The non-return valve in each of the cross-over flow paths ensures that when the flow of the first heat transfer fluid through the heat exchanger module passes through both of the heat dissipation portions, that there is no reverse flow that would reduce the efficiency of the waste heat energy rejection to the respective dissipation medium.

Optionally, a temperature of the second dissipation medium, $T_{SECOND}$, is greater than a temperature of the first dissipation medium, $T_{FIRST}$, a temperature of the first heat transfer fluid entering the first heat exchanger module, $T_{IN}$, is greater than a temperature of the second dissipation medium, $T_{SECOND}$, the first heat transfer fluid is first directed through the second heat dissipation portion, and wherein a temperature of the first heat transfer fluid exiting the second heat dissipation portion is $T_{OUT2}$, a temperature of the first dissipation medium is $T_{FIRST}$, and where $T_{OUT2}$ is less than $T_{FIRST}$, the first heat transfer fluid exits the first heat exchanger module, and where $T_{OUT2}$ is greater than $T_{FIRST}$, the first heat transfer fluid is diverted to additionally pass through the first heat dissipation portion and then exits the first heat exchanger module.

In this arrangement, the temperature of the first heat transfer fluid is greater than the temperature of the second dissipation medium. The temperature of the thermal bus fluid is greater than the temperature of the fuel for the gas turbine engine.

The first heat transfer fluid is directed first through the second heat dissipation portion with waste heat energy being rejected to the second dissipation medium.

The thermal bus fluid passes through the fuel heat exchanger with waste heat energy being rejected to the engine fuel.

If at the outlet to the second heat dissipation portion, a temperature of the first heat transfer fluid is less than the temperature of the first dissipation medium, then the first heat transfer fluid exits the heat exchanger module.

However, if at the outlet to the second heat dissipation portion, a temperature of the first heat transfer fluid is greater than the temperature of the first dissipation medium, then the first heat transfer fluid is additionally diverted through the first heat dissipation portion with waste heat energy being rejected to the first dissipation medium. In other words, if the thermal bus fluid temperature at the exit to the fuel heat exchanger remains greater than the inlet air temperature, the thermal bus fluid is additionally routed through the inlet air heat exchanger before exiting the heat exchanger module. In this way, waste heat energy can be rejected both to the fuel for the engine, and to the inlet air flow before it enters the gas turbine engine.

Optionally, a temperature of the first heat transfer fluid entering the first heat exchanger module, $T_{IN}$, is less than a temperature of the second dissipation medium, $T_{SECOND}$, and the first heat transfer fluid is first directed through the first heat dissipation portion.

In this arrangement, the temperature of the first heat transfer fluid is less than the temperature of the second dissipation medium. The temperature of the thermal bus fluid is less than the temperature of the fuel for the gas turbine engine. In this situation, the first heat transfer fluid is directed only through the first heat dissipation portion. The temperature of the thermal bus fluid is less than a temperature of the fuel for the gas turbine engine, and so the thermal bus fluid is directed only through the inlet air heat exchanger because waste heat energy cannot be rejected to the fuel.

Optionally, a temperature of the first dissipation medium, $T_{FIRST}$, is greater than a temperature of the second dissipation medium, $T_{SECOND}$, a temperature of the first heat transfer fluid entering the first heat exchanger module, $T_{IN}$, is greater than a temperature of the first dissipation medium, $T_{FIRST}$, the first heat transfer fluid is first directed through the first heat dissipation portion, and wherein a temperature of the first heat transfer fluid exiting the first heat dissipation portion is $T_{OUT1}$, a temperature of the second dissipation medium is $T_{SECOND}$, and where $T_{OUT1}$ is less than $T_{SECOND}$, the first heat transfer fluid exits the first heat exchanger module, and where $T_{OUT1}$ is greater than $T_{SECOND}$, the first heat transfer fluid is diverted to additionally pass through the second heat dissipation portion and then exits the first heat exchanger module.

In this arrangement, the temperature of the first heat transfer fluid is greater than the temperature of the first dissipation medium. The temperature of the thermal bus fluid is greater than the temperature of the inlet air entering the gas turbine engine.

The first heat transfer fluid is directed first through the first heat dissipation portion with waste heat energy being rejected to the first dissipation medium. The thermal bus fluid passes through the inlet air heat exchanger with waste heat energy being rejected to the inlet air flow entering the gas turbine engine.

If at the outlet to the first heat dissipation portion, a temperature of the first heat transfer fluid is less than the temperature of the second dissipation medium, then the first heat transfer fluid exits the heat exchanger module.

However, if at the outlet to the first heat dissipation portion, a temperature of the first heat transfer fluid is greater than the temperature of the second dissipation medium, then the first heat transfer fluid is additionally diverted through the second heat dissipation portion with waste heat energy being rejected to the second dissipation medium. In other words, if the thermal bus fluid temperature at the exit to the inlet air heat exchanger remains greater than the fuel temperature, the thermal bus fluid is additionally routed through the fuel heat exchanger before exiting the heat exchanger module. In this way, waste heat energy can be rejected both to the inlet air flow before it enters the gas turbine engine, and to the fuel flow to the engine.

Optionally, a temperature of the first heat transfer fluid entering the first heat exchanger module, $T_{IN}$, is less than a temperature of the first dissipation medium, $T_{FIRST}$, and the first heat transfer fluid is first directed through the second heat dissipation portion.

In this arrangement, the temperature of the first heat transfer fluid is less than the temperature of the first dissipation medium. The temperature of the thermal bus fluid is less than the temperature of the inlet air entering the gas turbine engine. In this situation, the first heat transfer fluid is directed only through the second heat dissipation portion. The temperature of the thermal bus fluid is less than a temperature of the inlet air flow entering the gas turbine engine, and so the thermal bus fluid is directed only through the fuel heat exchanger because waste heat energy cannot be rejected to the inlet air flow.

According to a further aspect of the present disclosure, there is provided a method of operating a thermal management system for an aircraft, the thermal management system comprising a first gas turbine engine, one or more first electric machines rotatably coupled to the first gas turbine engine, and a first heat exchanger module, the method comprising the steps of:

(i) providing a first thermal bus comprising a first heat transfer fluid with the first heat transfer fluid providing fluid communication, in a closed loop flow sequence, between the first gas turbine engine, the or each first electric machine, and the first heat exchanger module;

(ii) providing the first heat exchanger module with a first heat dissipation portion and a second heat dissipation portion;

(iii) providing the first heat exchanger module with a first flow path and a second flow path;

(iv) arranging the first flow path as a flow of the first heat transfer fluid either through the first heat dissipation portion in which a first proportion $Q_A$ of the waste heat energy from the first heat transfer fluid is transferred to a first dissipation medium, or additionally through the second heat dissipation portion in which a second proportion $Q_B$ of the waste heat energy from the first heat transfer fluid is transferred to a second dissipation medium, in dependence on a temperature of the first heat transfer fluid entering the first heat exchanger module, a temperature of the first heat dissipation medium, and a temperature of the second heat dissipation medium; and (v) arranging the second flow path as a flow of the first heat transfer fluid to a second heat dissipation portion in which a second proportion $Q_B$ of the waste heat energy from the first heat transfer fluid is transferred to a second dissipation medium, or additionally to the first heat dissipation portion in which a first proportion $Q_A$ of the waste heat energy from the first heat transfer fluid is transferred to a first dissipation medium, in dependence on a temperature of the first heat transfer fluid entering the first heat exchanger module, a temperature of the first heat dissipation medium, and a temperature of the second heat dissipation medium.

The heat exchanger module comprises two flow paths, each of which comprises a corresponding heat dissipation portion. These flow paths are arranged in a parallel configuration with the first heat transfer fluid being able to be directed through either flow path. In addition, the heat exchanger module also includes two cross-over flow paths, with each cross-over path extending from an inlet of one of the heat dissipation portions to an outlet from the other of the heat dissipation portions. Each of the cross-over paths includes corresponding solenoid isolator and diverter valves at their junctions with the two main flow paths.

In this way, a flow entering the heat exchanger module can be directed through only one or other of the flow paths and thus through only one or other of the corresponding heat dissipation portions. Alternatively, by actuating the appropriate solenoid isolator and diverter valves, a flow entering the heat exchanger module can be directed first through one of the flow paths and the corresponding heat dissipation portion, and second through the other of the flow paths and the other of the corresponding heat dissipation portions.

In the arrangement where the flow entering the heat exchanger module passes sequentially through each of the flow paths and the corresponding heat dissipation portions, an appropriate selection of valve position enables the flow to pass through the two flow paths and heat dissipation portions in either order.

In this way, the first heat transfer fluid can be directed through any combination of the first heat dissipation portion, and the second dissipation portion, either alone or in combination. The selection of the flow sequence through the heat exchanger module is made on the basis of the temperatures of the corresponding first heat dissipation medium and the second heat dissipation medium in order to optimise the quantity of waste heat energy that can be rejected to the corresponding heat dissipation medium.

Optionally, method step (iii) comprises the additional steps of:
(iii)' measuring a temperature $T_{IN}$ of the first heat transfer fluid entering the first heat exchanger module;
(iii)" measuring a temperature $T_{SECOND}$ of the second dissipation medium, where $T_{IN}$ is greater than $T_{SECOND}$;
(iii)'" measuring a temperature $T_{OUT2}$ of the first heat transfer fluid exiting the second heat dissipation portion; and
(iii)"" measuring a temperature $T_{FIRST}$ of the first dissipation medium; and method steps (iv) and (v) comprise the following replacement steps;

(iv)' if $T_{OUT2}$ is less than $T_{FIRST}$, circulating the first heat transfer fluid only through the second heat dissipation portion; and
(v)' if $T_{OUT2}$ is greater than $T_{FIRST}$, circulating the first heat transfer fluid first through the second heat dissipation portion, and then through the first heat dissipation portion.

In this arrangement, the temperature of the first heat transfer fluid is greater than the temperature of the second dissipation medium. The temperature of the thermal bus fluid is greater than the temperature of the fuel for the gas turbine engine.

The first heat transfer fluid is directed first through the second heat dissipation portion with waste heat energy being rejected to the second dissipation medium. The thermal bus fluid passes through the fuel heat exchanger with waste heat energy being rejected to the engine fuel.

If at the outlet to the second heat dissipation portion, a temperature of the first heat transfer fluid is less than the temperature of the first dissipation medium, then the first heat transfer fluid exits the heat exchanger module.

However, if at the outlet to the second heat dissipation portion, a temperature of the first heat transfer fluid is greater than the temperature of the first dissipation medium, then the first heat transfer fluid is additionally diverted through the first heat dissipation portion with waste heat energy being rejected to the first dissipation medium. In other words, if the thermal bus fluid temperature at the exit to the fuel heat exchanger remains greater than the inlet air temperature, the thermal bus fluid is additionally routed through the inlet air heat exchanger before exiting the heat exchanger module. In this way, waste heat energy can be rejected both to the fuel for the engine, and to the inlet air flow before it enters the gas turbine engine.

Optionally, method step (iii) comprises the additional steps of:
(iii)' measuring a temperature $T_{IN}$ of the first heat transfer fluid entering the first heat exchanger module;
(iii)" measuring a temperature $T_{SECOND}$ of the second dissipation medium, where $T_{IN}$ is less than $T_{SECOND}$;
(iii)'" measuring a temperature $T_{OUT2}$ of the first heat transfer fluid exiting the second heat dissipation portion; and
(iii)"" measuring a temperature $T_{FIRST}$ of the first dissipation medium; and method steps (iv) and (v) comprise the following replacement step;
(iv)' circulating the first heat transfer fluid only through the first heat dissipation portion.

In this arrangement, the temperature of the first heat transfer fluid is less than the temperature of the second dissipation medium. The temperature of the thermal bus fluid is less than the temperature of the fuel for the gas turbine engine. In this situation, the first heat transfer fluid is directed only through the first heat dissipation portion. The temperature of the thermal bus fluid is less than a temperature of the fuel for the gas turbine engine, and so the thermal bus fluid is directed only through the inlet air heat exchanger because waste heat energy cannot be rejected to the fuel.

Optionally, method step (iii) comprises the additional steps of:
(iii)' measuring a temperature $T_{IN}$ of the first heat transfer fluid entering the first heat exchanger module;
(iii)" measuring a temperature $T_{SECOND}$ of the second dissipation medium;

(iii)''' measuring a temperature Tour of the first heat transfer fluid exiting the first heat dissipation portion; and (iii)'''' measuring a temperature $T_{FIRST}$ of the first dissipation medium, where $T_{IN}$ is greater than $T_{FIRST}$;

and method steps (iv) and (v) comprise the following replacement steps;

(iv)' if Tour is less than $T_{SECOND}$, circulating the first heat transfer fluid only through the first heat dissipation portion; and (v)' if Tour is greater than $T_{SECOND}$, circulating the first heat transfer fluid first through the first heat dissipation portion, and then through the second heat dissipation portion.

In this arrangement, the temperature of the first heat transfer fluid is greater than the temperature of the first dissipation medium. The temperature of the thermal bus fluid is greater than the temperature of the inlet air entering the gas turbine engine.

The first heat transfer fluid is directed first through the first heat dissipation portion with waste heat energy being rejected to the first dissipation medium. The thermal bus fluid passes through the inlet air heat exchanger with waste heat energy being rejected to the inlet air flow entering the gas turbine engine.

If at the outlet to the first heat dissipation portion, a temperature of the first heat transfer fluid is less than the temperature of the second dissipation medium, then the first heat transfer fluid exits the heat exchanger module.

However, if at the outlet to the first heat dissipation portion, a temperature of the first heat transfer fluid is greater than the temperature of the second dissipation medium, then the first heat transfer fluid is additionally diverted through the second heat dissipation portion with waste heat energy being rejected to the second dissipation medium. In other words, if the thermal bus fluid temperature at the exit to the inlet air heat exchanger remains greater than the fuel temperature, the thermal bus fluid is additionally routed through the fuel heat exchanger before exiting the heat exchanger module. In this way, waste heat energy can be rejected both to the inlet air flow before it enters the gas turbine engine, and to the fuel flow to the engine.

Optionally, method step (iii) comprises the additional steps of:

(iii)' measuring a temperature $T_{IN}$ of the first heat transfer fluid entering the first heat exchanger module; and (iii)'' measuring a temperature $T_{FIRST}$ of the first dissipation medium, where $T_{IN}$ is less than $T_{FIRST}$;

and method steps (iv) and (v) comprise the following replacement step;

(iv)' circulating the first heat transfer fluid only through the second heat dissipation portion.

In this arrangement, the temperature of the first heat transfer fluid is less than the temperature of the first dissipation medium. The temperature of the thermal bus fluid is less than the temperature of the inlet air entering the gas turbine engine. In this situation, the first heat transfer fluid is directed only through the second heat dissipation portion. The temperature of the thermal bus fluid is less than a temperature of the inlet air flow entering the gas turbine engine, and so the thermal bus fluid is directed only through the fuel heat exchanger because waste heat energy cannot be rejected to the inlet air flow.

According to a first aspect of the present disclosure there is provided a thermal management system for an aircraft, the thermal management system comprising a first gas turbine engine, a first thermal bus, a first heat exchanger, and a chiller; wherein the first thermal bus comprises a first heat transfer fluid, the first heat transfer fluid being in fluid communication, in a closed loop flow sequence, between the first gas turbine engine, the first heat exchanger, and the chiller, such that waste heat energy generated by the first gas turbine engine, is transferred to the first heat transfer fluid, the chiller is configured to lower a temperature of the first heat transfer fluid prior to the first heat transfer fluid being circulated through the gas turbine engine, and the first heat exchanger is configured to transfer the waste heat energy from the first heat transfer fluid to a dissipation medium.

The use of a chiller to lower a temperature of the first heat transfer fluid circulating within the first thermal bus will increase a capacity of the thermal management system to transfer waste heat energy generated by the gas turbine engine to the first heat exchanger, where it can be dissipated to a dissipation medium.

Lowering a temperature of the first heat transfer fluid will result in a larger temperature differential between the temperature of the first heat transfer fluid and the temperature of the first gas turbine engine than would be the case without use of the chiller. This increased temperature differential will result in an increase in the rate at which waste heat energy can be transferred from the first gas turbine engine to the first heat transfer fluid. This makes the thermal management system of the present disclosure more efficient and hence more useful to a user than equivalent conventional systems.

Optionally, the thermal management system further comprises one or more first electric machines rotatably coupled to the first gas turbine engine, and wherein the first heat transfer fluid is in fluid communication, in a closed loop flow sequence, between the first gas turbine engine, the or each first electric machine, and the first heat exchanger, such that waste heat energy generated by at least one of the first gas turbine engine, and the or each first electric machine, is transferred to the first heat transfer fluid.

The or each first electric machine may be an electric motor or may be an electric generator or may be an electric motor/generator. The electric machine may provide a starting capability to the gas turbine engine. The electric machine may be used to motor or brake one or more of the spools of the gas turbine engine to optimise an engine performance characteristic of the gas turbine engine.

Optionally, the thermal management system further comprises one or more first ancillary systems, and
wherein the first heat transfer fluid is in fluid communication, in a closed loop flow sequence, between the first gas turbine engine, the first heat exchanger, and the or each first ancillary system, such that waste heat energy generated by at least one of the first gas turbine engine, and the or each first ancillary system, is transferred to the first heat transfer fluid.

The first thermal bus provides a thermal conduit between heat generating portions, such as, for example, a gas turbine engine, an electric machine, and an ancillary system, and heat dissipating portions, such as the heat exchanger. Consequently, waste heat energy generated by the gas turbine engine, electric machine and ancillary system can be transferred to the heat exchanger where it can be dissipated to a dissipation medium.

Examples of first ancillary system may include, for example, power converters for use with the electric machine, and the electrical control and thermal regulation of an energy storage system, for example battery or capacitive energy storage. Indeed, any aircraft-borne equipment or system that requires operation within pre-determined temperature limits, and which generates waste heat energy during its operation at a temperature greater than the temperature of the first heat transfer fluid, may be considered to be a first ancillary system.

Optionally, the thermal management system further comprises a vapour compression system, one or more second ancillary systems, and a second heat exchanger, and wherein waste heat energy generated by the or each second ancillary system is transferred to a second heat transfer fluid, the second heat exchanger is configured to transfer the waste heat energy from the second heat transfer fluid to the first heat transfer fluid, and the vapour compression system is configured to increase a temperature of the second heat transfer fluid having passed through the or each second ancillary system to a value greater than a temperature of the first heat transfer fluid entering the second heat exchanger, such that waste heat energy generated by the or each second ancillary system can be transferred to the first heat transfer fluid.

The use of a vapour compression system enables waste heat energy that is generated at a temperature lower than that of the first heat transfer fluid (the water/glycol mixture) to be raised in temperature to a higher temperature that is greater than that of the first heat transfer fluid. This enables the waste heat energy to be transferred to the first heat transfer fluid and then subsequently dissipated to the dissipation medium as outlined above.

Examples of second ancillary system may include, for example, aircraft environmental conditioning systems (cabin blower, air conditioning, etc.), sensing equipment (radar and other location sensing apparatus), and other scientific analysis and sensing equipment. Indeed, any aircraft-borne equipment or system that requires operation within pre-determined temperature limits, and which generates waste heat energy during its operation at a temperature lower than the temperature of the first heat transfer fluid may be considered to be a second ancillary system.

Optionally, the chiller is the vapour compression system.

The vapour compression system may be operated such that the refrigerant circulating in the vapour compression system has a lower temperature than the first heat transfer fluid circulating in the first thermal bus. Consequently, the vapour compression system can absorb heat energy from the first heat transfer fluid, having the effect of chilling the first thermal bus.

Optionally, the first gas turbine engine comprises, in axial flow sequence, a compressor module, a combustor module, and a turbine module, and the dissipation medium is an inlet air flow passing through the first heat exchanger and entering the compressor module.

Optionally, the first gas turbine engine comprises, in axial flow sequence, a compressor module, a combustor module, and a turbine module, and the dissipation medium is a fuel flow passing through the first heat exchanger and subsequently being directed to the combustor module.

According to a further aspect of the present disclosure, there is provided a method of operating a thermal management system for an aircraft, the thermal management system comprising a first gas turbine engine, one or more first electric machines rotatably coupled to the first gas turbine engine, a first heat exchanger, and one or more first ancillary systems, the method comprising the steps of:
(i) providing a first thermal bus comprising a first heat transfer fluid with the first heat transfer fluid providing fluid communication, in a closed loop flow sequence, between the first gas turbine engine, the first heat exchanger, and the chiller;
(ii) transferring a waste heat energy generated by the first gas turbine engine, to the first heat transfer fluid;
(iii) operating the chiller to lower a temperature of the first heat transfer fluid prior to the first heat transfer fluid being circulated through the gas turbine engine; and
(iv) transferring the waste heat energy from the first heat transfer fluid to a dissipation medium.

The use of a chiller to lower a temperature of the first heat transfer fluid circulating within the first thermal bus will increase a capacity of the thermal management system to transfer waste heat energy generated by the gas turbine engine to the first heat exchanger, where it can be dissipated to a dissipation medium.

Lowering a temperature of the first heat transfer fluid will result in a larger temperature differential between the temperature of the first heat transfer fluid and the temperature of the first gas turbine engine than would be the case without use of the chiller. This increased temperature differential will result in an increase in the rate at which waste heat energy can be transferred from the first gas turbine engine to the first heat transfer fluid. This makes the thermal management system of the present disclosure more efficient and hence more useful to a user than equivalent conventional systems.

According to a further aspect of the present disclosure there is provided a thermal management system for an aircraft, the aircraft comprising a first gas turbine engine, one or more first electric machines rotatably coupled to the gas turbine engine, a first thermal bus, and a first heat exchanger, wherein the first thermal bus comprises a first heat transfer fluid, the first heat transfer fluid being in fluid communication, in a closed loop flow sequence, between the first gas turbine engine, the or each first electric machine, and the first heat exchanger, such that waste heat energy generated by at least one of the first gas turbine engine, and the or each first electric machine, is transferred to the first heat transfer fluid, and the first heat exchanger is configured to transfer the waste heat energy from the first heat transfer fluid to a dissipation medium, and
wherein, during steady-state operation of the first gas turbine engine, the first heat transfer fluid entering the first heat exchanger has a temperature of $T_{FLUID}$ (° C.), and a temperature of an inlet air flow entering the first gas turbine engine has a temperature $T_{AIR}$ (° C.) and wherein a ratio B of:

$$B = \frac{(\text{First Heat Transfer Fluid Temperature} = T_{FLUID})}{(\text{Inlet Air Temperature} = T_{AIR})}$$

is in a range of between 5.0 and 18.0.

The first thermal bus circulates a first heat transfer fluid between various heat generating systems within the aircraft such as, for example, a gas turbine engine, and an electric machine. Waste heat energy generated by these systems is rejected to the first heat transfer fluid thus increasing a temperature of the first heat transfer fluid.

Optionally, the first gas turbine engine comprises, in axial flow sequence, the first heat exchanger, a compressor module, a combustor module, and a turbine module, and the dissipation medium is an inlet air flow passing through the first heat exchanger.

By dissipating the waste heat energy from the first heat transfer fluid to an airflow entering the gas turbine engine, the thermal management system can continuously dissipate waste heat energy whilst the gas turbine engine is operating. This enables operation of the thermal management system even when the aircraft is stationary whilst the gas turbine engine is operating. This makes the thermal management system of the disclosure more convenient and desirable for a user.

Optionally, the first gas turbine engine comprises, in axial flow sequence, a compressor module, a combustor module, and a turbine module, and the dissipation medium is a fuel flow passing through the first heat exchanger and subsequently being directed to the combustor module.

Using a fuel flow to the gas turbine engine to dissipate waste heat energy enables higher waste heat energy levels to be dissipated than by dissipation to an inlet airflow to the gas turbine engine. However, the heat exchanger requirements and the associated control mechanisms are more complex for a dissipation to fuel than for a dissipation to air.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.40, 0.39, 0.38, 0.37, 0.36, 0.35, 0.34, 0.33, 0.32, 0.31, 0.30, 0.29, 0.28, 0.27 or 0.26. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The diameter of the fan may be measured across the engine centreline and between the tips of opposing fan blades at their leading edge. The fan diameter may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 63 inches). The fan diameter may be in an inclusive range bounded by any two of the values in the previous sentence (i.e., the values may form upper or lower bounds), for example in the range of from 50 cm to 70 cm or 90 cm to 130 cm.

The fan face area may be calculated as π multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan at cruise conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e., the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, 1.5, 1.6, 1.7, 1.8, 1.9, 2.0, 2.4, 2.8, 3.2, 3.6, or 4.0. The bypass ratio may be in an inclusive range bounded by any two of the values in the previous sentence (i.e., the values may form upper or lower bounds), for example in the range of form of 0.4 to 1.0, 0.5 to 0.9, or 0.6 to 0.9. Alternatively, the bypass ratio may be in a bounded range in the form of 1.0 to 4.0, 1.8 to 3.6, or 2.4 to 3.6. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e., the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine as described and/or claimed herein may be less than (or on the order of) any of the following: 800 $Nkg^{-1}s$, 850 $Nkg^{-1}s$, 900 $Nkg^{-1}s$, 950 $Nkg^{-1}s$, 1000 $Nkg^{-1}s$, 1050 $Nkg^{-1}s$, 1100 $Nkg^{-1}s$, 1150 $Nkg^{-1}s$, 1200 $Nkg^{-1}s$, 1250 $Nkg^{-1}s$, 1300 $Nkg^{-1}s$, 1350 $Nkg^{-1}s$, or 1400 $Nkg^{-1}s$. The specific thrust may be in an inclusive range bounded by any two of the values in the previous sentence (i.e., the values may form upper or lower bounds), for example in the range of from 800 $Nkg^{-1}s$ to 950 $Nkg^{-1}s$, or 900 $Nkg^{-1}s$ to 1350 $Nkg^{-1}s$. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 KN, 60 KN, 80 KN, 100 KN, 120 kN, 140 KN, 160 KN, 180 kN, or 200 kN. The maximum thrust may be in an inclusive range bounded by any two of the values in the previous sentence (i.e., the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1500K, 1550K, 1600K, 1650K, 1700K, 1750K, 1800K, 1850K, 1900K, 1950K, or 2000K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e., the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan stage of a turbofan gas turbine engine as described and/or claimed herein may have any desired number of fan blades, for example 12, 14, 16, 18, 20, 22, 24, 26, 28, 30, 32, or 34 fan blades.

As used herein, cruise conditions have the conventional meaning and would be readily understood by the skilled person. In this regard, cruise conditions encompass both subsonic cruise conditions and supersonic cruise conditions. Thus, for a given turbofan gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given turbofan gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the subsonic cruise condition may be any point in the range of from Mach 0.80 to 0.99, for example 0.80 to 0.85, for example 0.85 to 0.90, for example 0.90 to 0.95, for example 0.95 to 0.99, for example in the region of Mach 0.80, in the region of Mach 0.85 or in the range of from 0.80 to 0.85. Any single speed within these ranges may be part of the cruise condition. For some aircraft, the cruise conditions may be outside these ranges, for example below Mach 0.80.

Purely by way of example, the subsonic cruise conditions may correspond to standard atmospheric conditions (according to the International Standard Atmosphere, ISA) at an altitude that is in the range of from 7000 m to 17000 m, for example in the range of from 10000 m to 16000 m, for example in the range of from 11000 m to 15000 m (around 50000 ft), for example in the range of from 12500 m to 15000 m, for example in the region of 15000 m. The cruise conditions may correspond to standard atmospheric conditions at any given altitude in these ranges.

Purely by way of example, the forward speed at the supersonic cruise condition may be any point in the range of from Mach 1.20 to 2.20, for example 1.35 to 2.10, for example 1.50 to 2.05, for example in the region of Mach 2.00 or in the range of from 1.80 to 2.00. Any single speed within these ranges may be part of the cruise condition. For some aircraft, the cruise conditions may be outside these ranges, for example between Mach 1.0 and 1.20, or above Mach 2.20.

Purely by way of example, the supersonic cruise conditions may correspond to standard atmospheric conditions (according to the International Standard Atmosphere, ISA) at an altitude that is in the range of from 11000 m to 19000 m, for example in the range of from 12500 m to 17000 m, for example in the range of from 15000 m to 17000 m (around 56000 ft), for example in the range of from 16000 m to 17000 m, for example in the region of 17000 m. The cruise conditions may correspond to standard atmospheric conditions at any given altitude in these ranges.

Purely by way of example, the subsonic cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the supersonic cruise conditions may correspond to an operating point of the engine that provides a known required thrust level (for example a value in the range of from 70 kN to 120 kN) at a forward Mach number of 1.50 and standard atmospheric conditions (according to the International Standard Atmosphere) at an altitude of 56000 ft (17000 m).

In use, a turbofan gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
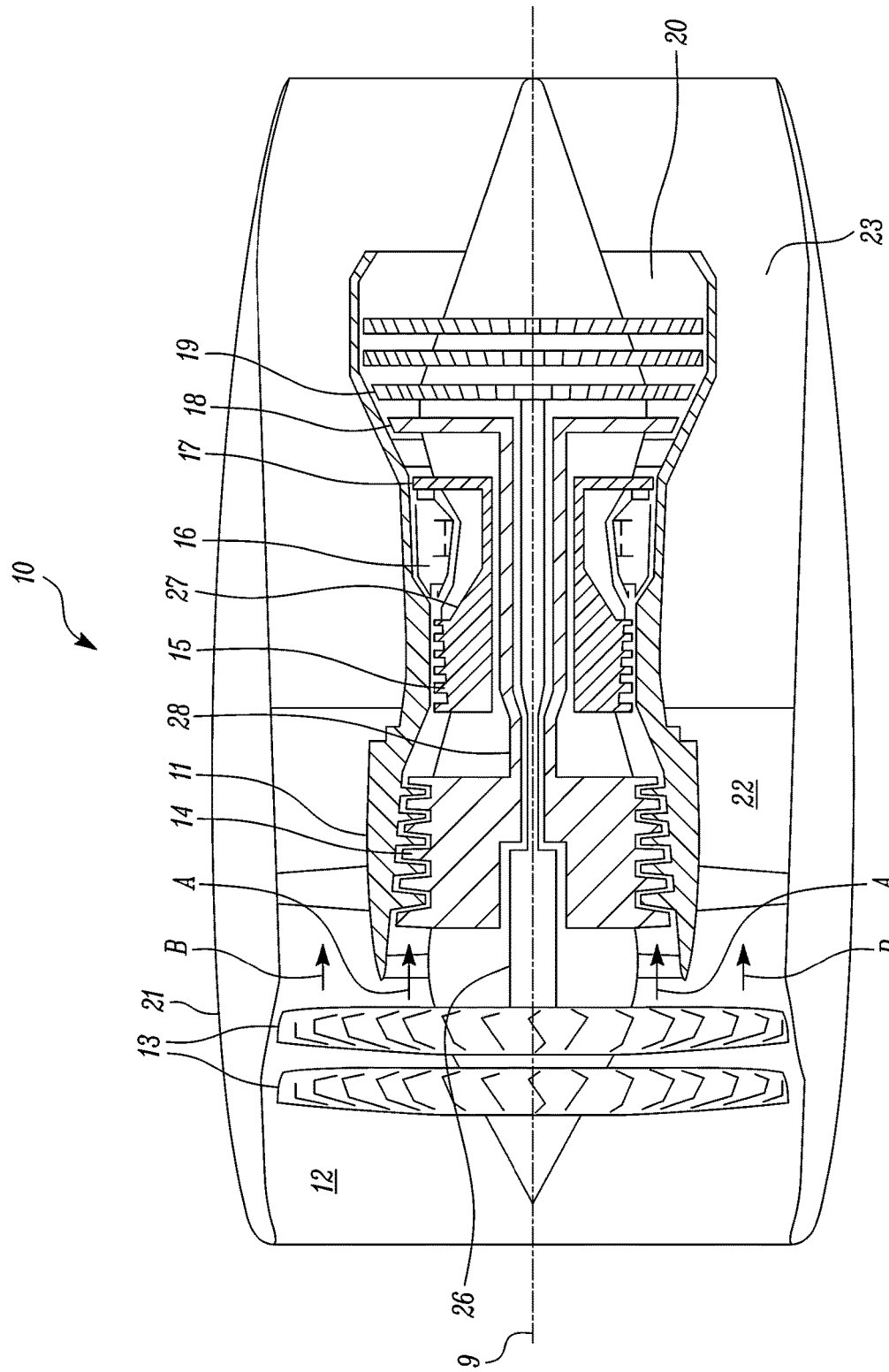
FIG. 1 shows a schematic cross-sectional view of a turbofan gas turbine engine according to the prior art.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust.

Note that the terms "low-pressure turbine" and "low-pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
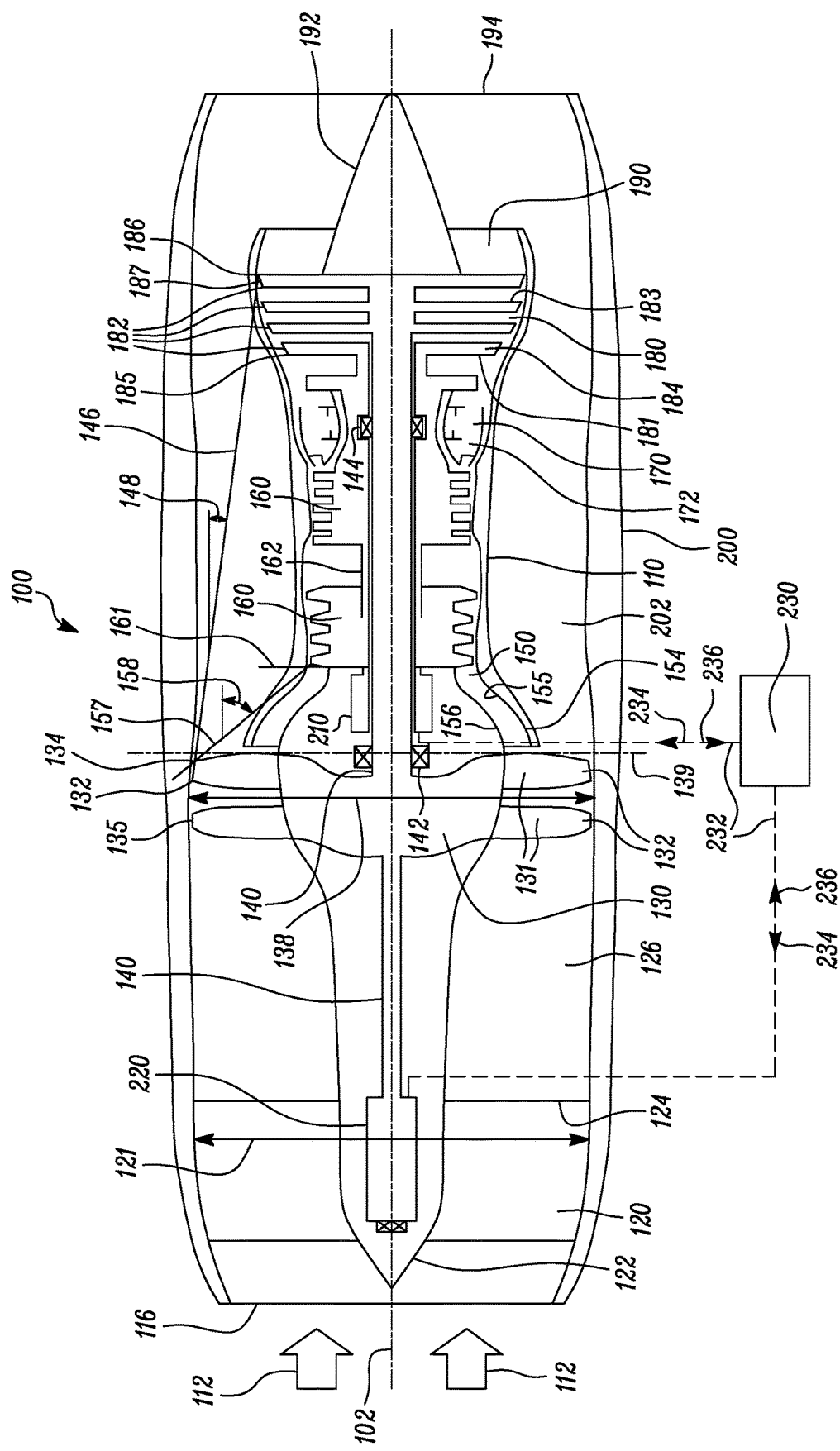
FIG. 2 shows a schematic cross-sectional view of a turbofan gas turbine engine according to an embodiment of the disclosure.

Referring to FIG. 2, a turbofan gas turbine engine according to a first embodiment of the disclosure is designated generally by the reference numeral 100. The turbofan gas turbine engine 100 comprises in axial flow sequence, a heat exchanger module 120, a fan assembly 130, a compressor module 160, a combustor module 170, and a turbine module 180. The gas turbine engine 100 has an axial length L 104 between an inlet face 116 of the engine 100 to an exhaust face 194 of the engine.

The gas turbine engine 100 has a longitudinal axis 102 being the rotational axis 102 of the compressor and turbine assemblies 160, 180. The gas turbine engine 100 has a first side 105 and a second side 106 defined as opposing sides of the rotational axis 102 in a direction extending from an exhaust face 194 of the gas turbine engine 100 to an inlet face 116 of the gas turbine engine 100. The first side 105 is the left side of the engine 100 in a direction from the exhaust face 194 to the inlet face 116. Likewise, the second side 106 is the right side of the engine 100 in a direction from the exhaust face 194 to the inlet face 116.

An axial direction is defined as being in the direction of the axis of rotation 102 of the gas turbine engine 100. Axial constraint 264 is provided in the axial direction. A lateral direction is defined as being perpendicular to the axis of rotation 102 of the gas turbine engine 100 and as extending in the direction of the left and right sides 105, 106 of the gas turbine engine 100. Lateral constraint 262 is provided in the lateral direction. A vertical direction is defined as being perpendicular to the axis of rotation 102 of the gas turbine engine 100 and also perpendicular to the lateral direction of the gas turbine engine 100. Vertical constraint 260 is provided in the vertical direction.

The fan assembly 130 (also termed a low-pressure compressor) is rotationally connected to the low-pressure turbine 181 by an LP shaft 140. The compressor assembly 160 is rotationally connected to the high-pressure turbine 183 by an HP shaft 162.

In the present arrangement, the fan assembly 130 comprises two fan stages 131, with each fan stage 131 comprising a plurality of fan blades 132. In the present arrangement each fan stage 131 has the same fan diameter 138, with the respective plurality of fan blades defining a fan diameter of 0.9 m. Each fan blade 132 has a leading edge 133 and a corresponding trailing edge 134. The fan assembly 130 comprises, in axial flow sequence, a lowest pressure fan stage and a highest-pressure fan stage.

In an alternative arrangement, the two fan stages 131 may have different fan diameters 136 each defined by the corresponding plurality of fan blades 132. As previously mentioned, the fan diameter ($D_{FAN}$) 136 is defined by a circle circumscribed by the leading edges of the respective plurality of fan blades 132.

The turbine module 180 comprises, in axial flow sequence, a low-pressure turbine 181 and a high-pressure turbine 183. Each of the low-pressure turbine 181 and high-pressure turbine 183 has a turbine stage comprising a row of turbine blades 184, with each of the turbine blades 184 extending radially outwardly and having a leading edge 185 and a corresponding trailing edge 186.

A fan tip axis 146 is defined as extending from a radially outer tip 135 of the leading edge 133 of one of the plurality of fan blades 132 of the highest-pressure fan stage 131, to a radially outer tip 187 of the trailing edge 186 of one of the turbine blades 184 of the lowest pressure turbine stage 181. The fan tip axis 146 extends in a longitudinal plane which contains a centreline of the gas turbine engine 102, and a fan axis angle 148 is defined as the angle between the fan tip axis 146 and the centreline 102. In the present embodiment, the fan axis angle has a value of 18 degrees.

The heat exchanger module 120 comprises a plurality of heat transfer elements 124 extending radially outwardly from a central hub 122. The heat exchanger module 120 is in fluid communication with the fan assembly 130 by an inlet duct 126. The heat exchange module 120 has an axial length of 0.4 m, this being 0.4 times the fan diameter of 0.9 m.

The inlet duct 126 extends between a downstream-most face of the heat transfer elements and an upstream-most face of the fan assembly. In the present arrangement, the inlet duct 126 is linear. However, in other arrangements the inlet duct 126 may be curved or convoluted.

The inlet duct 126 has a fluid path length of 3.6 m, this being 4.0 times the fan diameter of 0.9 m. The fluid path length extends along a central axis 102 of the inlet duct 126.

The heat exchanger module 120 has a flow area ($A_{HEX}$). The heat exchanger module flow area is the cross-sectional area of the heat exchanger module 120 through which an air flow 112 passes before being ingested by the fan assembly 130. In the present arrangement, the heat exchanger module flow area has an annular cross-section and corresponds directly to the shape of the air flow passing through the heat exchanger module 120.

The fan assembly 130 has a corresponding flow area ($A_{FAN}$). The fan assembly flow area is the cross-sectional area of the fan assembly 130 through which an air flow 112 passes before separating into a core engine flow and a bypass flow. The fan assembly flow area has an annular shape since it corresponds to the annular area swept by the fan blades 132.

The fan assembly 130 is fluidly connected to the compressor module 160 by an intermediate duct 150. The intermediate duct 150 directs a proportion of the inlet air flow 112 into the core engine 110. The intermediate duct 150 extends axially rearwards and radially inwards.

In the present arrangement, the heat exchanger module flow area is equal to the fan assembly flow area, and the corresponding ratio of $A_{HEX}/A_{FAN}$ is equal to 1.0.

The heat exchanger module 120 has a flow diameter (E) 121, which is the diameter of the air flow passing through the heat exchanger module 120. In the present arrangement, the heat exchanger module flow diameter 121 is equal to the fan diameter 136.

The heat exchanger module 120 comprises a plurality of heat transfer elements 124 for the transfer of heat energy from a first fluid 275 contained within the heat transfer elements 124 to an airflow 112 passing over a surface of the heat transfer elements 124 prior to entry of the airflow 112 into the fan assembly 130. In the present embodiment, the first fluid 275 is a mineral oil. In other arrangements, the first fluid 275 may be an alternative heat transfer fluid such as, for example, a water-based fluid, or the fuel used by the turbofan gas turbine engine.

The heat transfer elements 124 have a conventional tube and fin construction and will not be described further. In an alternative arrangement, the heat transfer elements 124 may have a different construction such as, for example, plate and shell.

The turbofan gas turbine engine 100 further comprises an outer housing 200. The outer housing 200 fully encloses the sequential arrangement of the heat exchanger module 120, inlet duct 126, fan assembly 130, compressor module 160, combustor module 170, and turbine module 180. The outer housing 200 defines a bypass duct 202 between the outer housing 200 and the core engine components (comprising inter alia the compressor module 160 and the turbine module 180). In the present arrangement, the bypass duct 202 has a generally axi-symmetrical annular cross-section extending over the core engine components. In other arrangements, the bypass duct 202 may have a non-symmetric annular cross-section or may not extend around a complete circumference of the core engine components.

A first electric machine 210 is rotationally connected to the HP shaft 162 axially upstream of the compressor assembly 160. The first electric machine 210 does not extend axially beyond an inlet plane 161 of the compressor module 160. The first electric machine 210 has an axial length 212 $L_{EM}$ and a diameter 214 $D_{EM}$. A ratio of the axial length 212 to the diameter 214 ($L_{EM}/D_{EM}$) for the first electric machine 210 is 1.2.

The first electric machine 210 may operate as an electric motor and rotationally drive the HP shaft 162. Alternatively, the first electric machine 210 may operate as an electric generator, in which arrangement it is rotationally driven by the HP shaft 162.

The first electric machine 210 is electrically connected to an electrical energy storage unit 230 by an electrical connection 232. In the present arrangement, the electrical energy storage unit 230 takes the form of a battery pack 230. When the first electric machine 210 is operating as an electric generator, electrical energy is routed via the electrical connection 232 to the electrical energy storage unit 230. Likewise, electrical energy may be directed from the electrical energy storage unit 230 to the first electric machine 210 when the first electric machine is operating as an electric motor.

A second electric machine 220 is positioned upstream of the fan assembly 130 and accommodated within the central hub 122 of the heat exchanger module 120. The second electric machine 220 is rotationally connected to the fan assembly 130. As outlined above for the first electric machine 210, the second electric machine 220 is electrically connected to the electrical energy storage unit 230 by an electrical connection 232. Likewise, the second electric machine 20 may be operated as an electric generator with electrical energy routed to the electrical energy storage unit 230 via the electrical connection 232. Alternatively, the second electric machine 220 may be operated as an electric motor with electrical energy routed from the electrical energy storage unit 230 via the electrical connection 232.

The HP shaft 162 is supported on a first bearing assembly 142 and second bearing assembly 144. The first bearing assembly 142 is positioned axially between the fan assembly 130 and the first electric machine 210. In the present arrangement, the lowest-pressure fan stage 131 extends axially partially over the first bearing assembly 142.

Figure 3:
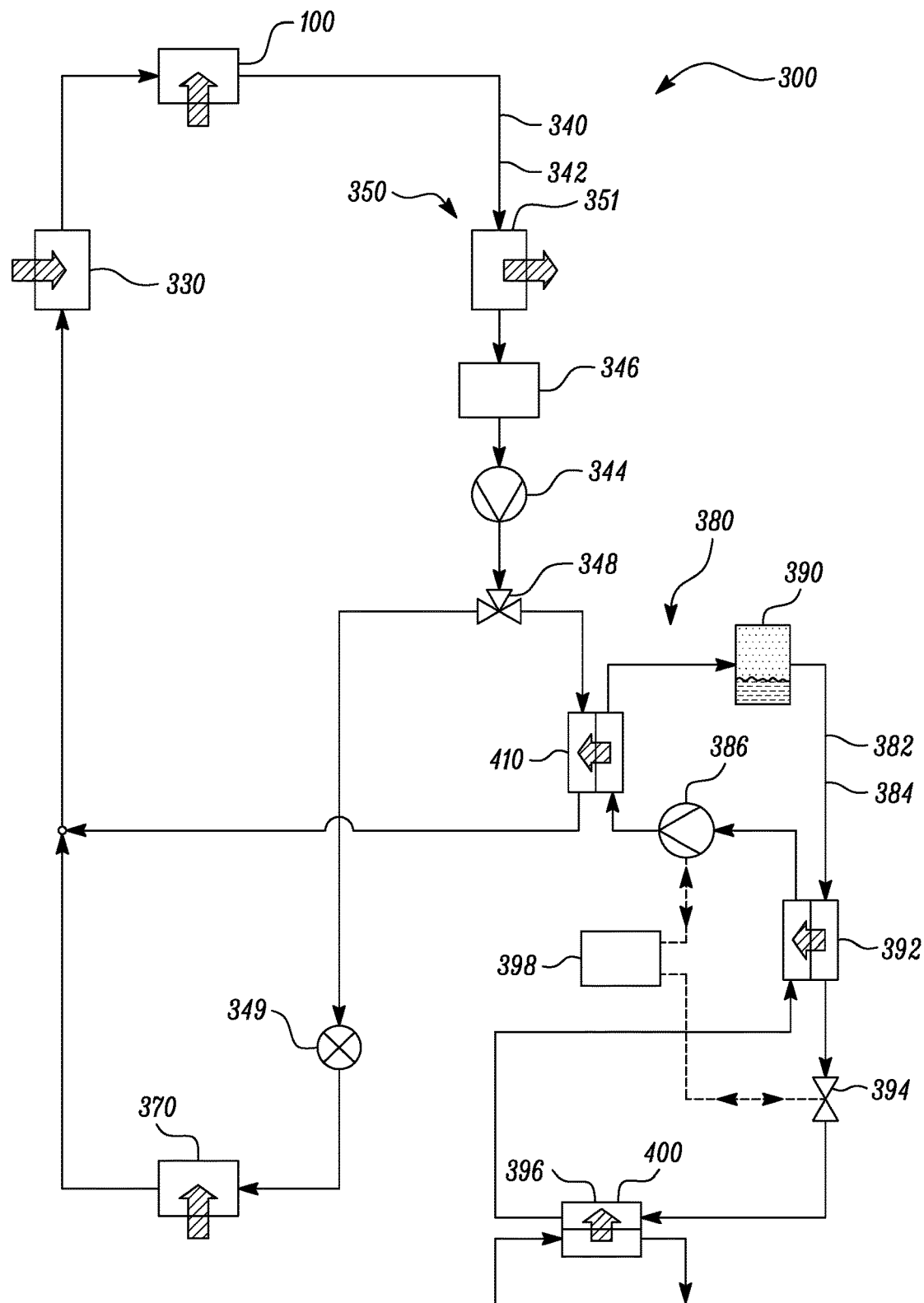
FIG. 3 shows a schematic diagram of a thermal management system for a single-engined aircraft according to an embodiment of the disclosure.

Referring to FIG. 3, a thermal management system according to an embodiment of the disclosure is designated generally by the reference numeral 300.

The thermal management system 300 comprises a first gas turbine engine 100, one or more first electric machines 330, a first thermal bus 340, a first heat exchanger 351, and one or more first ancillary systems 312. The or each first electric machine 330 is rotatably coupled to the first gas turbine engine 100. The thermal management system 300 of the arrangement of FIG. 3 includes a single gas turbine engine 100.

The first thermal bus 340 comprises a first heat transfer fluid 342. The first heat transfer fluid 342 is circulated around the first thermal bus 340 in a closed loop flow arrangement. Each of the or each first electric machine 330, the first gas turbine engine 100, the first heat exchanger 351, and the or each first ancillary system 312 is in fluid communication, in a closed loop flow sequence.

In one embodiment of the disclosure, the first heat transfer fluid 342 is a water/ethylene glycol mixture. Alternatively, the first heat transfer fluid 342 may be, for example, a water/propylene glycol mixture, or a working fluid used in the first gas turbine engine 100 such as, for example, lubricating oil, or fuel.

Waste heat energy that is generated by at least one of the first gas turbine engine 100, the or each first electric machine 330, and the or each first ancillary system 312, is transferred to the first heat transfer fluid 342. The first heat exchanger 351 is configured to transfer this waste heat energy from the first heat transfer fluid 342 to a dissipation medium 350.

In the arrangement of FIG. 3, the first heat transfer fluid 342 is circulated around the first thermal bus 340 by a pump 344, with the first heat transfer fluid 342 volume being maintained with the use of a accumulator 346. After leaving the pump 344, the first heat transfer fluid 342 enters a three-way valve 348. From here, the flow of the first heat transfer fluid 342 can pass through a second heat exchanger 410, where it collects waste heat energy transferred from a vapour compression system 380.

The vapour compression system 380 comprises, in closed-loop flow sequence, a pump 386, a second heat exchanger 410, an accumulator 390, a recuperator 392, an expansion valve 394, an evaporator 396, and then back to the recuperator 392, and the pump 386. The vapour compression system 380 comprises a refrigerant circuit 382 through which is circulated a refrigerant fluid 384.

The refrigerant circuit 382 comprises a 'hot leg' and a 'cold leg', together forming a flow circuit. The 'hot leg' extends from the recuperator 392, through the pump 386, the second heat exchanger 410, the accumulator 390 and back to the recuperator 392. The 'cold leg' extends from the recuperator 392, through the expansion valve 394, the evaporator 396, and back to the recuperator 392. The refrigerant fluid 384 in the 'hot leg' is at a higher temperature than the refrigerant fluid 384 in the 'cold leg'.

The performance of the vapour compression system 380 can be adjusted by varying the settings of the pump 386 and the expansion valve 394 by means of a controller 398.

The vapour compression system 380 serves to raise a temperature of the waste heat energy generated by one or more second ancillary systems 400. This waste heat energy is transferred to the refrigerant fluid 384 via the evaporator 396. From the evaporator 396, the refrigerant fluid 384 passes through the recuperator 392 where is picks up heat energy from the 'hot leg' of the refrigerant circuit 382. The refrigerant fluid 384 then passes through the pump 386 before passing through the second heat exchanger 410 where the waste heat energy from the or each second ancillary system 400 is transferred to the first heat transfer fluid 342 of the first thermal bus 340.

From the second heat exchanger 410, the refrigerant fluid 384 passes through the accumulator 390, back through the recuperator 392, the expansion valve 394 and re-enters the evaporator 396.

Alternatively, instead of passing through the second heat exchanger 410 as detailed above, the first heat transfer fluid 342 can be directed from the three-way valve 348 to a bypass valve 349, and thence to collect waste heat energy from one or more second ancillary systems 370.

From the second ancillary system 370, the first heat transfer fluid 342 continues around the first thermal bus 340 where it collects waste heat energy from the or each first electric machine 330, and the first gas turbine engine 100. At this point, the first heat transfer fluid 342 has collected waste heat energy from all of the heat generating systems of the aircraft 310 that are to be cooled. Consequently, the first heat transfer fluid 342 is at its maximum temperature. At this point, the first heat transfer fluid 342 enters the first heat exchanger 350 where the waste heat energy contained in the first heat transfer fluid 342 is dissipated to a dissipation medium 350.

After leaving the first heat exchanger 350, the first heat transfer fluid 342 enters the accumulator 346 and pump 344 before restarting its route around the first thermal bus 340.

Figure 4:
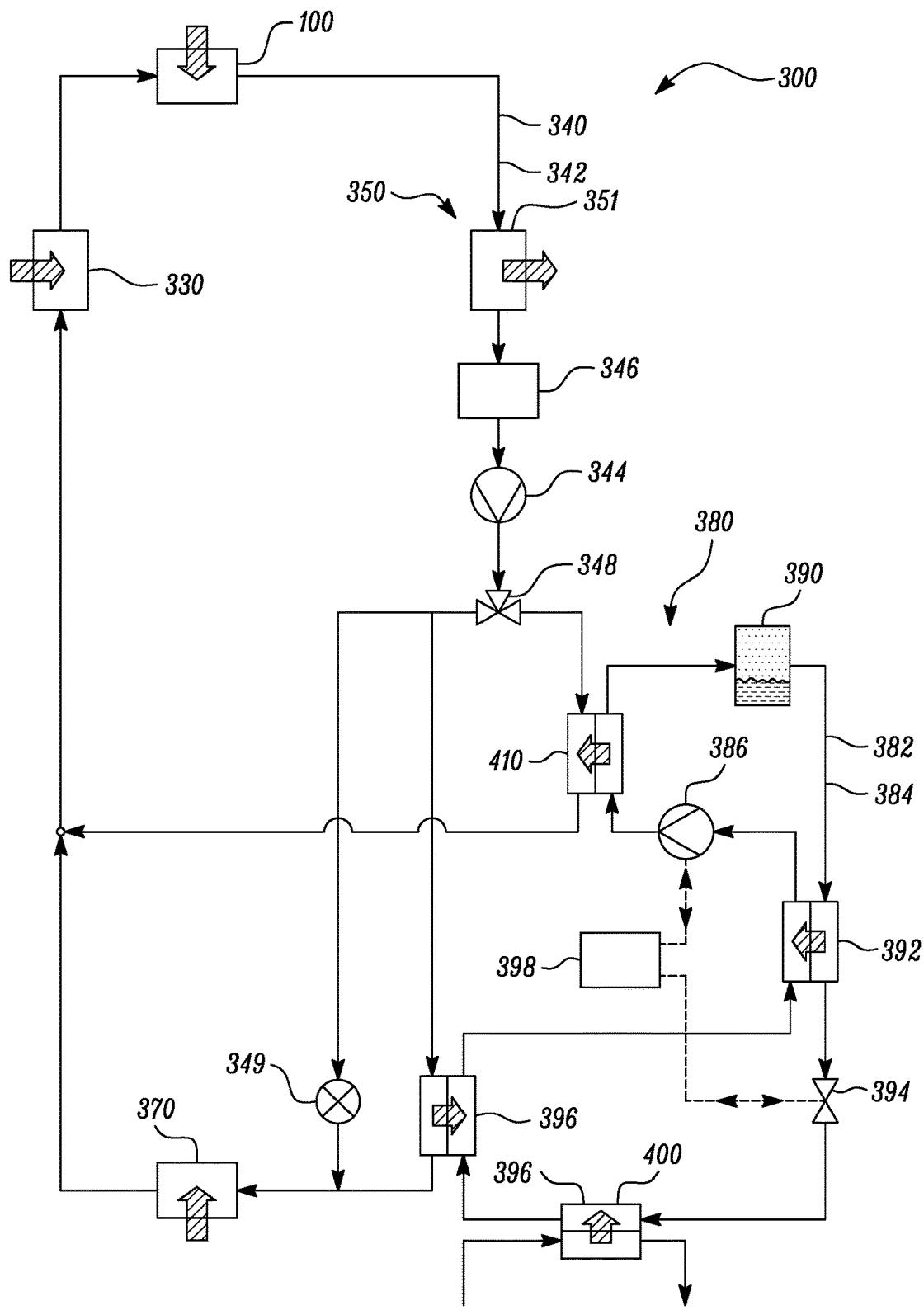
FIG. 4 shows a schematic diagram of a thermal management system for a single-engined aircraft according to an alternative embodiment of the disclosure.

FIG. 4 illustrates an alternative embodiment of the thermal management system 300. The arrangement of FIG. 4 differs from that of FIG. 3 in that the vapour compression system 380 includes two evaporators 396 in the 'cold leg' of the refrigerant circuit 382. The additional evaporator 396 is arranged to collect waste heat energy from the first heat transfer fluid 342 of the first thermal bus 340 and transfer this waste heat energy to the refrigerant fluid 384 of the refrigerant circuit 382.

The arrangement of FIG. 4 provides the advantage that the additional heat energy collected from the first heat transfer fluid 342 further increases the temperature of the refrigerant fluid 384 and thus increasing an efficiency of the transfer of the waste heat energy to the first heat transfer fluid 342 via the second heat exchanger 410.

Figure 5:
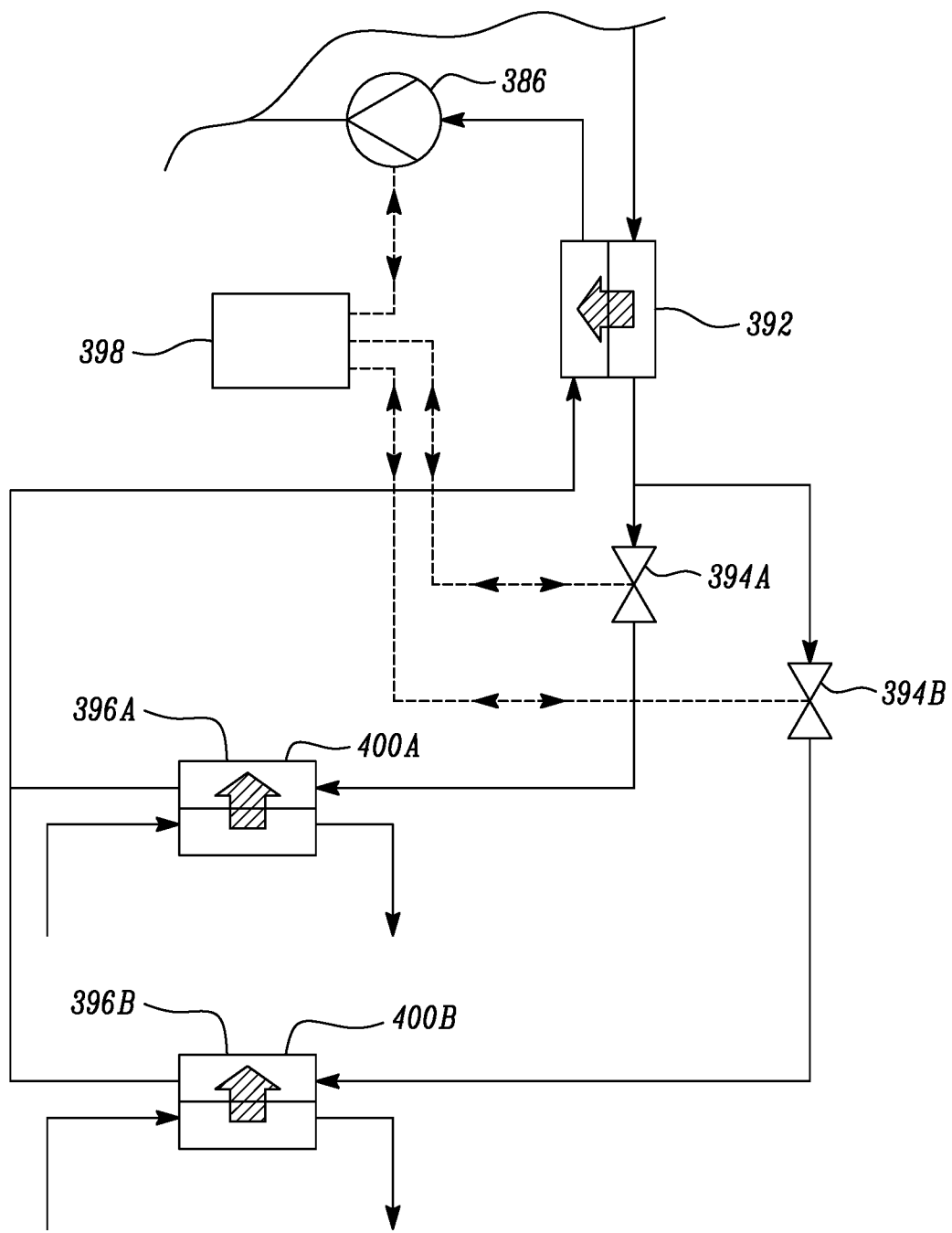
FIG. 5 shows a schematic partial view of a thermal management system for an aircraft according to an alternative embodiment of the disclosure, showing the use of parallel recuperators.

In an alternative arrangement of the vapour compression system 380, illustrated in FIG. 5, the 'cold leg' of the refrigerant circuit 382 comprises two parallel evaporator 396A, 396B circuits. Each of these two parallel circuits includes a corresponding expansion valve 394A, 394B; both of which are controlled by the controller 398. In other arrangements of the thermal management system there may be more than two parallel evaporator circuits.

An advantage of using two parallel evaporator 396A, 396B circuits is that each evaporator 396A, 396B may be configured to collect waste heat energy from a corresponding one of the second ancillary systems 400 at a different temperature. This may be particularly advantageous for a user where there are multiple second ancillary systems 400, each of which is required to be maintained at a different temperature.

Figure 6:
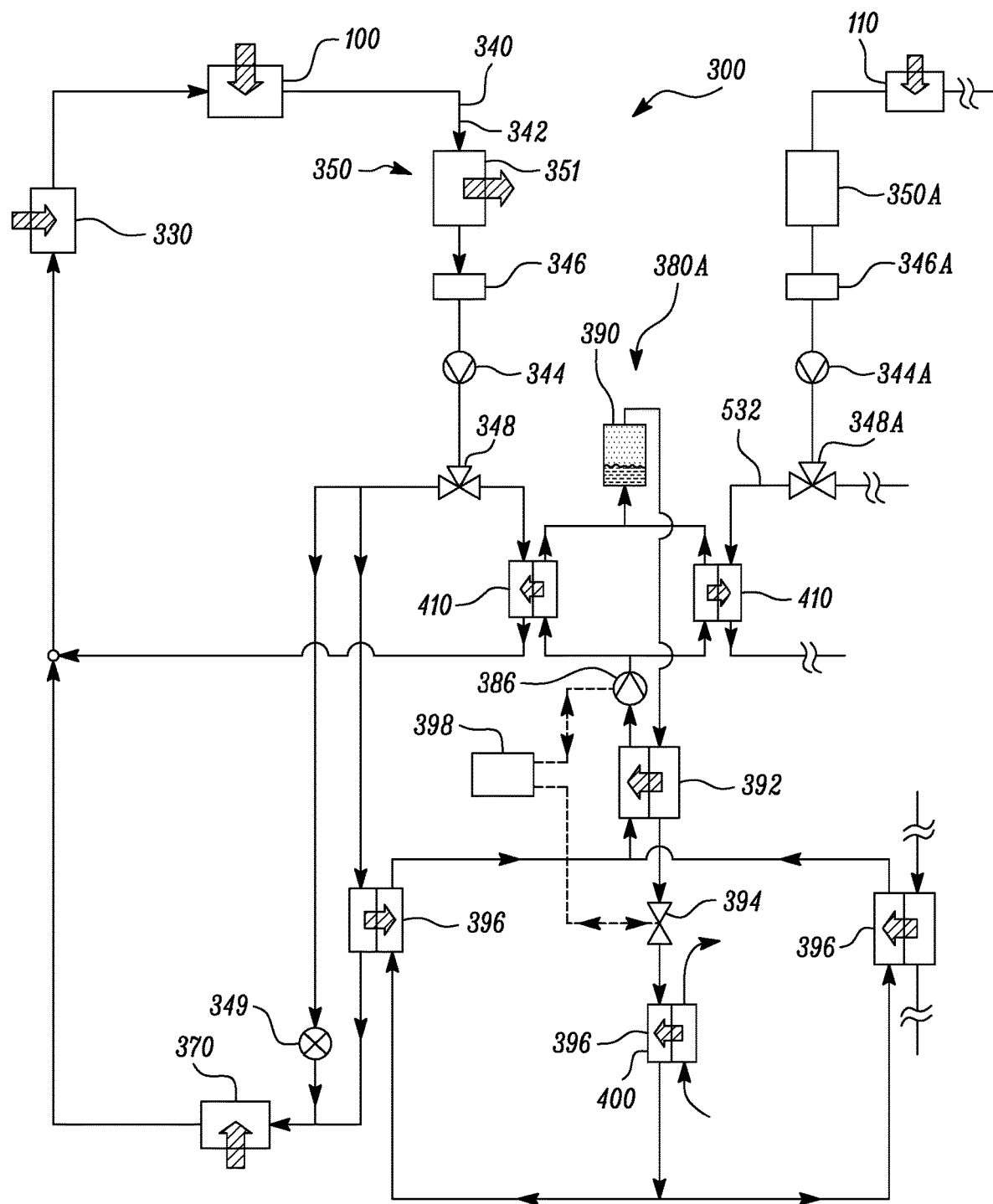
FIG. 6 shows a schematic diagram of a thermal management system for a twin-engined aircraft according to an alternative embodiment of the disclosure.

In a further alternative arrangement, illustrated in FIG. 6, the thermal management system 300 may comprise two gas turbine engines 100, 110. A first gas turbine engine 100 is incorporated in the first thermal bus 340 that in turn is interfaced with the vapour compression system 380.

In a two-engined arrangement, a single vapour compression system 380 is interposed between a first thermal bus 340 with the first gas turbine engine 100, and a third thermal bus 532 with the second gas turbine engine 110.

The third thermal bus 532, only part of which is illustrated in FIG. 6 has the same configuration as the first thermal bus 340, albeit in a 'mirror image' layout with respect to the shared vapour compression system 380A.

The vapour compression system 380A has broadly the same configuration as the vapour compression system 380 that is illustrated in FIG. 4 in that the vapour compression system 380 has a 'hot leg' and a 'cold leg' that are separated from one another by a recuperator 392.

In the arrangement of FIG. 6, the 'hot leg' comprises, from the recuperator 392, pump 386, followed by two second heat exchangers 410 arranged in parallel, an accumulator 390, and back to the recuperator 392. Similarly, the 'cold leg' comprises from the recuperator 392, an expansion valve 394, an evaporator 396 that receives waste heat energy from the or each second ancillary system 400, two further evaporators 396 interfacing with the first thermal bus 340 and the third thermal bus 532 and arranged in parallel with one another, and back to the recuperator 392.

This arrangement of two gas turbine engines 100, 110 sharing a single vapour compression system 380A provides an efficient means of transferring low temperature waste heat energy from the second ancillary, system(s) to the first thermal bus 340 and the third thermal bus 532, for subsequent transfer to the corresponding dissipation mediums 350.

Figure 7:
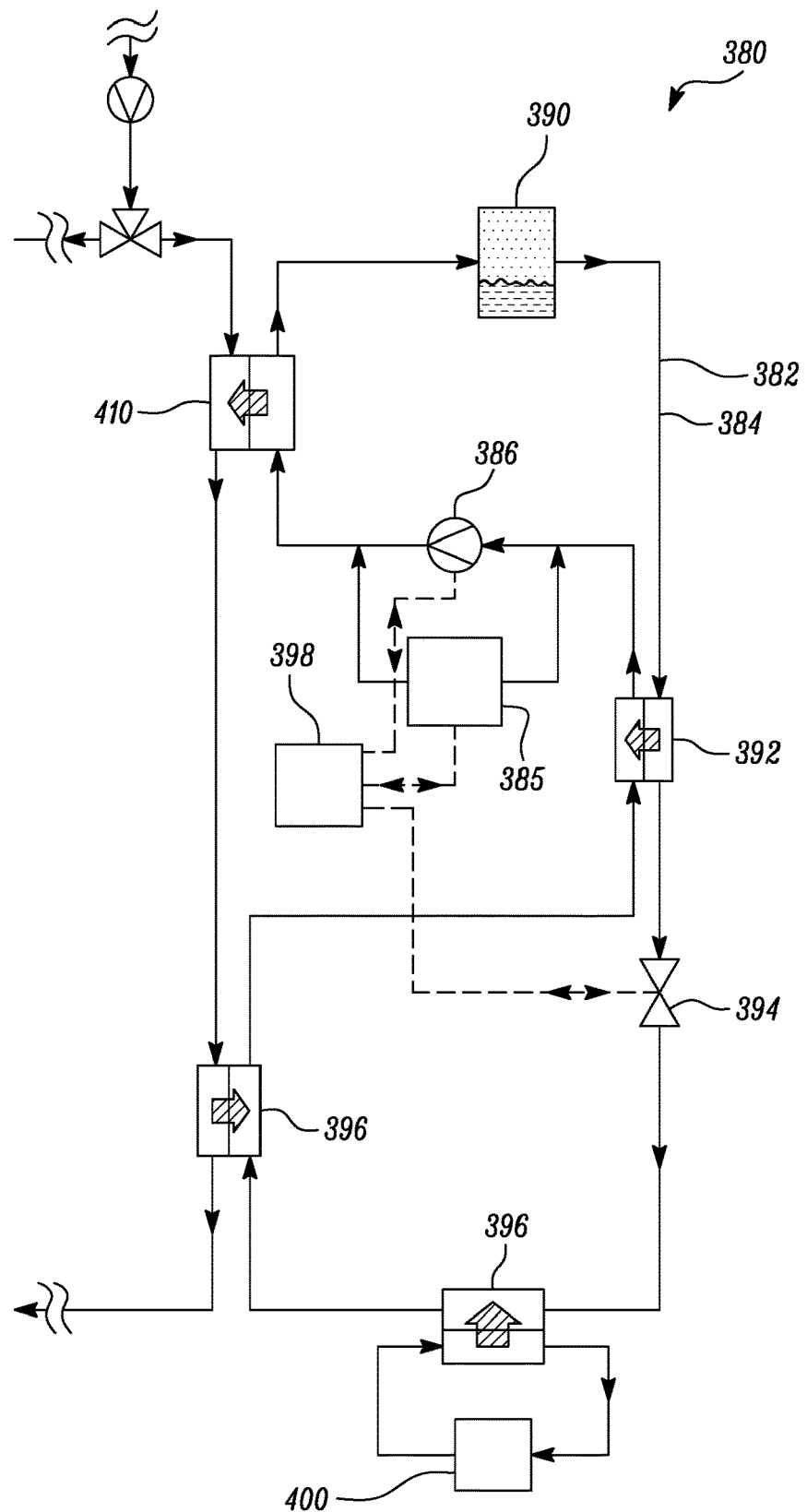
FIG. 7 shows a schematic partial diagram of a thermal management system according to an embodiment of the disclosure, showing a modified layout for low temperature operation.

FIG. 7 illustrates a modification of the vapour compression system 380 to more effectively deal with operational scenarios in which the thermal management system is to be operated at lower-than-normal temperatures. In such scenarios, a temperature of the first heat transfer fluid 342.

The default operating state of the vapour compression system 380 uses the reverse-Rankine cycle (or a modified cycle) to move heat from a base temperature to a higher temperature with the pressure ratio of the cycle corresponding to the 'thermal lift' provided by the vapour compression system 380.

In an arrangement in which the heat sink temperature (in this case, the temperature of the first heat transfer fluid 342) is reducing, the pressure ratio required will drop.

In some situations, the temperature of the first heat transfer fluid 342 may reduce below the cooling temperature requirement for the second ancillary system(s) 400. Consequently, no 'thermal lift' is required (as the waste heat energy from the second ancillary system(s) 400 can be dissipated passively).

As a result, the vapour compression system 380 is unable to operate as normal. This in turn may require the vapour compression system 380 to be bypassed in order to ensure the second ancillary system(s) 400 are still cooled.

The arrangement of FIG. 7 modifies the vapour compression system 380 to assist in the 'passive' transfer of waste heat energy from the second ancillary system(s) 400 to the first heat transfer fluid 342 that is at a lower temperature.

The expansion valve 394 will be required to open to (or close to) to diameter of the system pipework, thereby removing any pressure drop introduced by the expansion valve 394 irrespective of the refrigerant 384 flow across it. Additionally, the volume of refrigerant fluid 384 in the vapour compression system 380 must be controlled, with additional refrigerant being supplied from a refrigerant reservoir 385. This ensures that the working pressure of the vapour compression system 380 can be set to enable heat absorption and heat rejection at a near-constant pressure. The controller 398 adjusts the position of the expansion valve 394 and the volume of refrigerant fluid 384 circulating in the vapour compression system 380 in order to enable this transfer of waste heat energy from the second ancillary system(s) 400 to the first heat transfer fluid 342. For example, the operating pressure will correspond to a temperature that lies between the desired temperature of the second ancillary system(s) 400 and that of the first heat transfer fluid 342. This would allow the vapour compression system 380 to transfer waste heat energy heat without being turned off or providing any 'thermal lift'.

Figure 8:
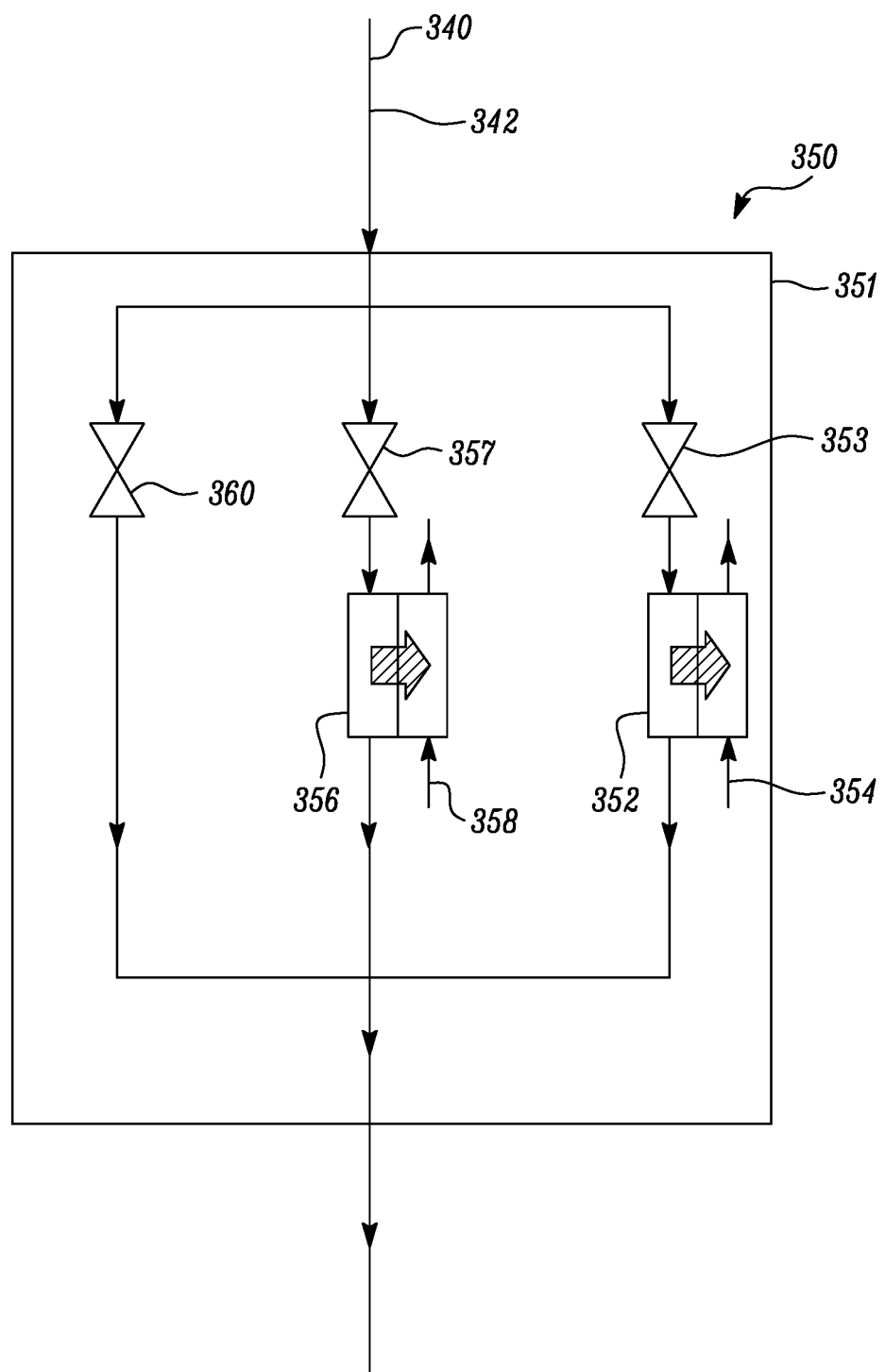
FIG. 8 shows a schematic diagram of a heat dissipation arrangement for the thermal management systems of the disclosure.

FIG. 8 illustrates the dissipation medium 350 in the form of the first heat exchanger 351. The first heat exchanger 350 comprises a fluid/air heat exchanger 352 with a fluid/air valve 353, a fluid/fluid heat exchanger 356 with a fluid/fluid valve 357, and a bypass valve 360. The fluid/air heat exchanger 352, the fluid/fluid heat exchanger 356, and the bypass valve 360 are arranged as three parallel fluid paths for the first heat transfer fluid 342 of the first thermal bus 340.

The fluid/air heat exchanger 352 receives a flow of the first heat transfer fluid 342 and transfers waste heat energy from the first heat transfer fluid 342 to an air flow 354. In one embodiment of the disclosure, this air flow 354 is an inlet air flow entering the first gas turbine engine 100 that is subsequently used for combustion in the first gas turbine engine 100. In alternative embodiments, the air flow 354 may be another flow of air that is separate from the first gas turbine engine 100.

Likewise, the fluid/fluid heat exchanger 356 receives a flow of the first heat transfer fluid 342 and transfers waste heat energy from the first heat transfer fluid 342 to a fluid flow 357. In one embodiment of the disclosure, this fluid flow 357 is a flow of fuel that subsequently is supplied to the first gas turbine engine 100 for combustion.

The first heat exchanger 350 is configured to direct a first proportion of the flow of the first heat transfer fluid 342 through the first heat dissipation portion 352. This results in a first proportion $Q_A$ of the waste heat energy from the first heat transfer fluid 342 being transferred to the first dissipation medium 354 in dependence on a temperature of the first dissipation medium 354 and a mass flow rate of the first dissipation medium 354.

Likewise, the first heat exchanger 350 is configured to direct a second proportion of the flow of the first heat transfer fluid 342 through the second heat dissipation portion 356. This results in a second proportion $Q_B$ of the waste heat energy from the first heat transfer fluid 342 being transferred to a second dissipation medium 358 in dependence on a temperature of the second dissipation medium 358 and a mass flow rate of the second dissipation medium 358.

In one arrangement of the thermal management system 300, the flow of the first heat transfer fluid 342 is either directed entirely through the first heat dissipation portion 352, entirely through the second heat dissipation portion 356, or entirely through the bypass valve 360. As set out above, the choice of first heat dissipation portion 352, second heat dissipation portion 356, or bypass valve 360, is made on the basis of the temperature and mass flow rate of each of the first dissipation medium 354 and the second dissipation medium 358. In alternative arrangements, the flow of the first heat transfer fluid 342 may be divided between any or all of the first heat dissipation portion 352, the second heat dissipation portion 356, and the bypass valve 360, again on the basis of the temperature and mass flow rate of each of the first dissipation medium 354 and the second dissipation medium 358.

In each of the above-mentioned scenarios in which the flow of the first heat transfer fluid 342 is to be directed through first heat dissipation portion 352, second heat dissipation portion 356, or bypass valve 360, the temperature and mass flow rate of each of the first dissipation medium 354 and the second dissipation medium 358 is used to determine the heat capacities of the first dissipation medium 354 and the second dissipation medium 358 such that the waste heat energy in the first heat transfer fluid 342 can be most effectively dissipated.

Figure 9:
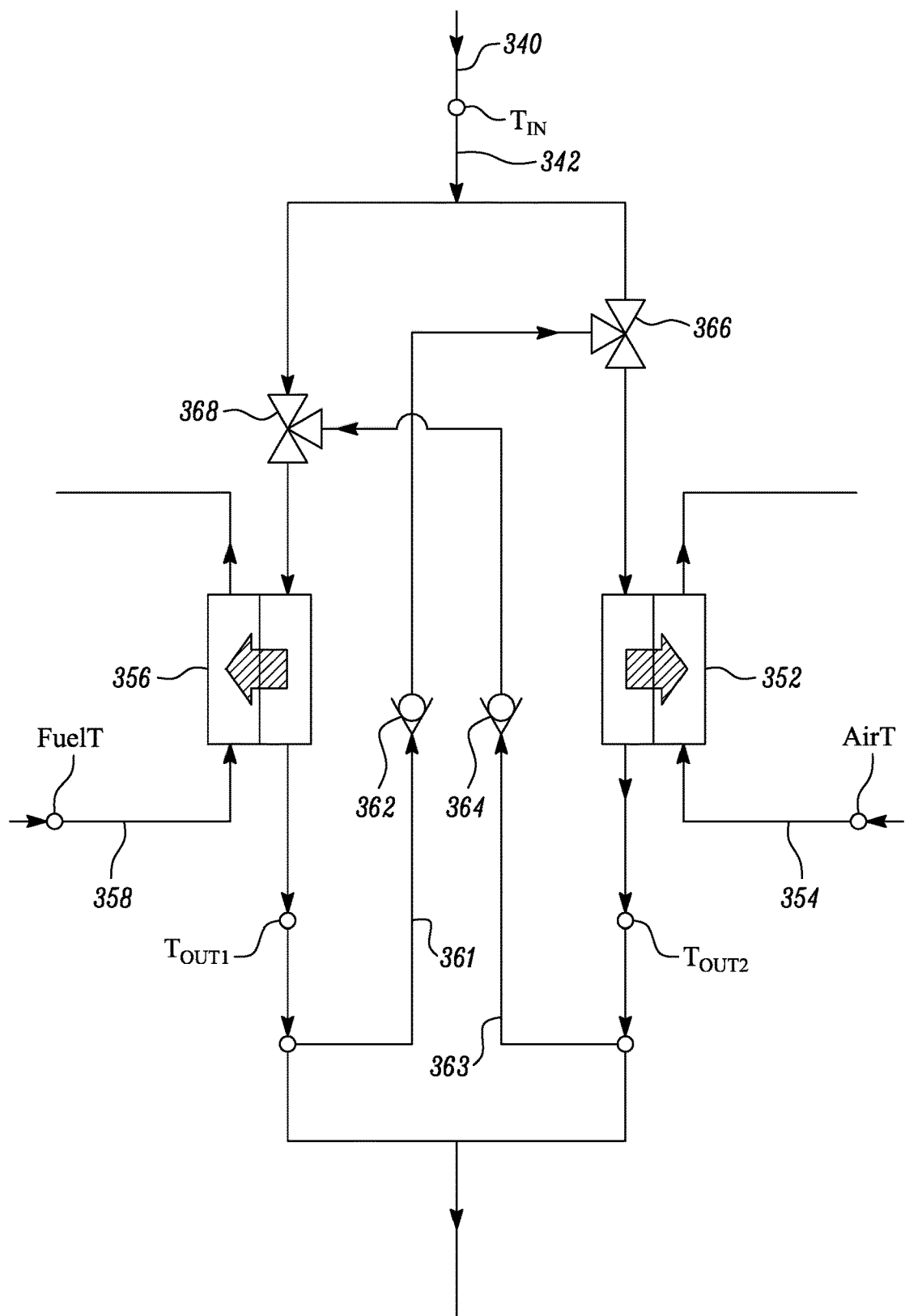
FIG. 9 shows a schematic diagram for a flow back scheme for the heat dissipation arrangement of FIG. 8.

In a further alternative configuration of fluid/air heat exchanger 352, illustrated in FIG. 9, the fluid/air heat exchanger 352 and the fluid/fluid heat exchanger 356 are interconnected. A first crossover path 361 connects an output from the fluid/fluid heat exchanger 356 to an input to the air/fluid heat exchanger 352. A second crossover path 363 connects an output from the air/fluid heat exchanger 352 to an input to the fluid/fluid heat exchanger 356.

A first 3-way valve 366 replaces the air/fluid heat exchanger valve 353, and a second 3-way valve 368 replaces the fluid/fluid heat exchanger valve 357. Additionally, a first non-return valve 362 is located in the first crossover path 361, and a second non-return valve 364 is located in the second crossover path 363. The non-return valves 362, 364 prevent any backflow of the first heat transfer fluid 342 during the crossover fluid routing.

The selection of the routing of the first heat transfer fluid 342 through the air/fluid heat exchanger 352 and/or the fluid/fluid heat exchanger 356 may be made on the basis of the temperatures of the various fluids. For example, a temperature $T_{IN}$ represents a temperature of the first heat transfer fluid 342 entering the first heat exchanger 351. A temperature Tour represents a temperature of the first heat transfer fluid 342 leaving the fluid/fluid heat exchanger 356. A temperature $T_{OUT2}$ represents a temperature of the first heat transfer fluid 342 leaving the air/fluid heat exchanger 352. A temperature $T_{FIRST}$ represents a temperature of the air flow 354 entering the air/fluid heat exchanger 352. A temperature $T_{SECOND}$ represents a temperature of the fluid flow 358 entering the fluid/fluid heat exchanger 356.

Figure 10B:
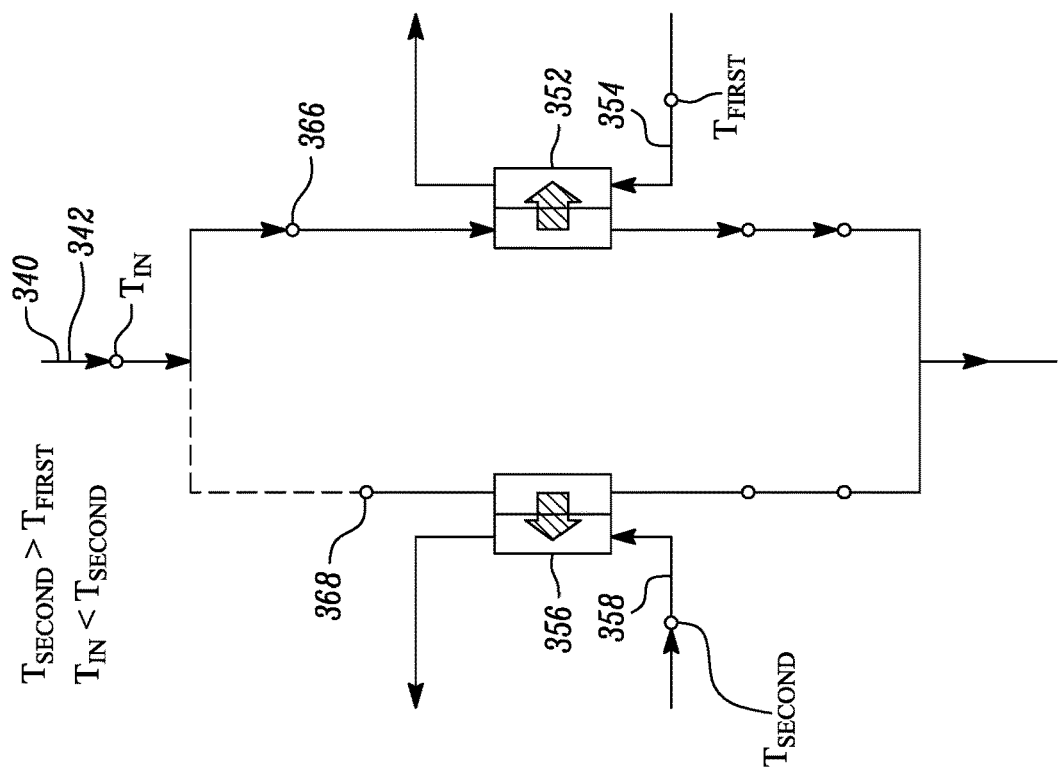
FIGS. 10(a), 10(b), 11(a), and 11(b) show schematic diagrams of the operating schemes for the flow back arrangement of FIG. 9.
Figure 10A:
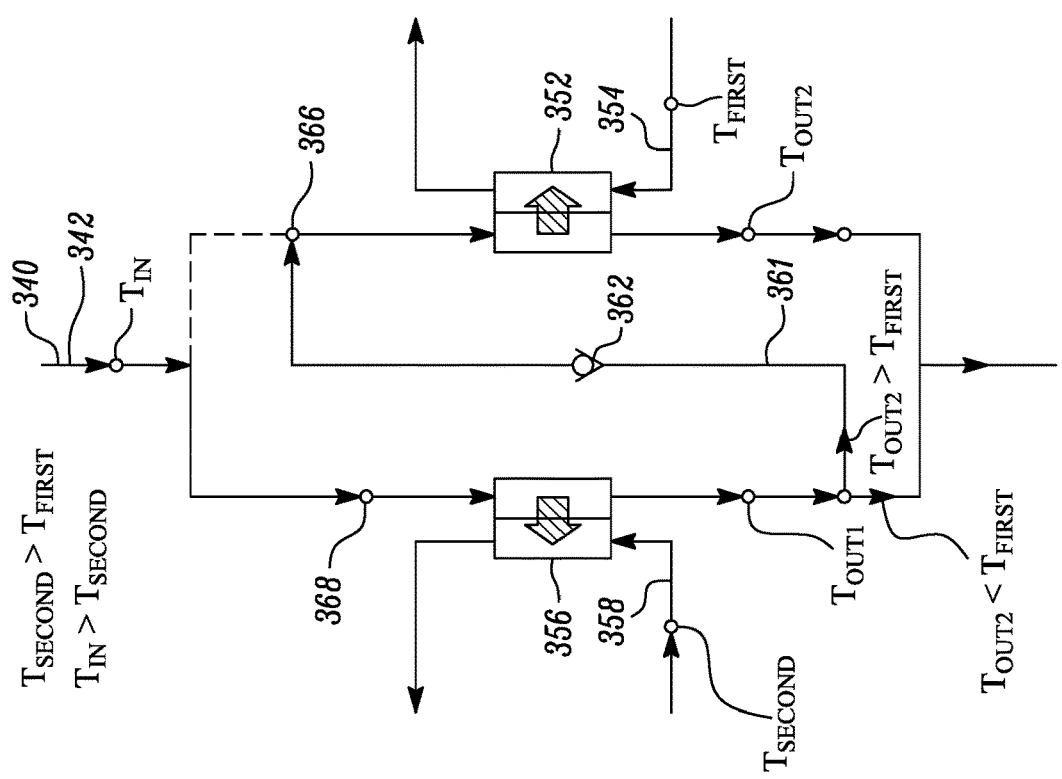

FIG. 10(a) illustrates the condition where the temperature $T_{SECOND}$ of the cooling fluid flow 358 entering the fluid/fluid heat exchanger 356 is greater than the temperature $T_{FIRST}$ of the cooling air flow 354 entering the air/fluid heat exchanger 352. Additionally, the temperature $T_{IN}$ of the first heat transfer fluid 342 entering the first heat exchanger 351 is greater than the temperature $T_{SECOND}$ of the fluid flow 358 entering the fluid/fluid heat exchanger 356.

If the temperature $T_{OUT2}$ of the first heat transfer fluid 342 leaving the air/fluid heat exchanger 352, is less than the temperature $T_{FIRST}$ of the air flow 354 entering the air/fluid heat exchanger 352, then the first heat transfer fluid 342 only passes through the fluid/fluid heat exchanger 356 and then exits the first heat exchanger 351.

However, if the temperature $T_{OUT2}$ of the first heat transfer fluid 342 leaving the air/fluid heat exchanger 352, is greater than the temperature $T_{FIRST}$ of the air flow 354 entering the air/fluid heat exchanger 352, then the first heat transfer fluid 342 first passes through the fluid/fluid heat exchanger 356, then passes through the air/fluid heat exchanger 352, before then exiting the first heat exchanger 351.

FIG. 10(b) illustrates the condition where the temperature T SECOND of the cooling fluid flow 358 entering the fluid/fluid heat exchanger 356 is greater than the temperature $T_{FIRST}$ of the cooling air flow 354 entering the air/fluid heat exchanger 352. Additionally, the temperature $T_{IN}$ of the first heat transfer fluid 342 entering the first heat exchanger 351 is less than the temperature $T_{SECOND}$ of the fluid flow 358 entering the fluid/fluid heat exchanger 356.

In this set of conditions, the first heat transfer fluid 342 only passes through the air/fluid heat exchanger 352 and then exits the first heat exchanger 351.

Figure 11B:
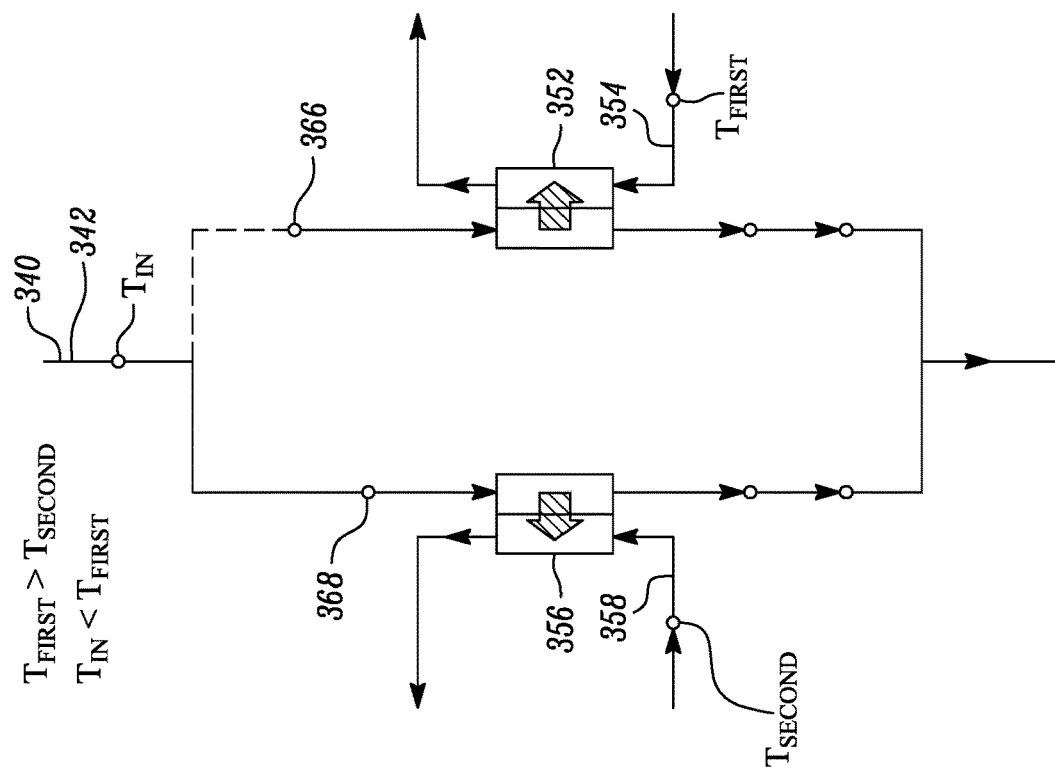
Figure 11A:
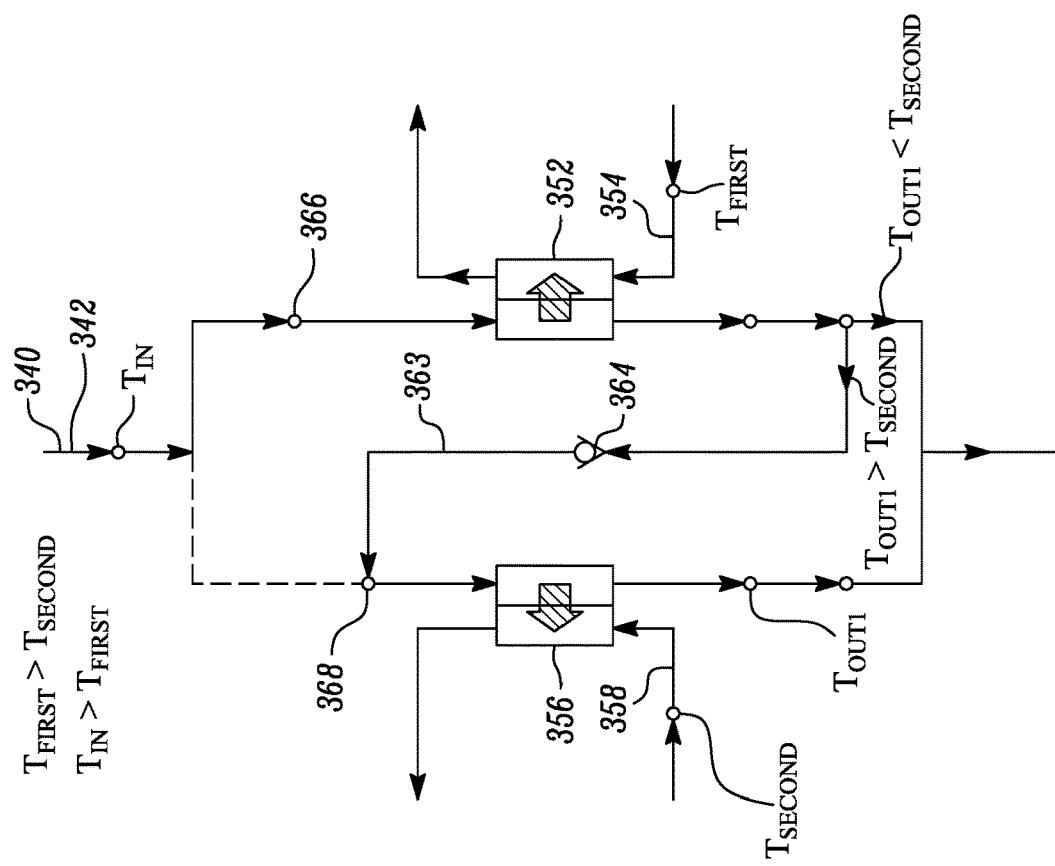

FIG. 11(a) illustrates the condition where the temperature $T_{FIRST}$ of the cooling air flow 354 entering the air/fluid heat exchanger 352 is greater than the temperature $T_{SECOND}$ of the cooling fluid flow 358 entering the fluid/fluid heat exchanger 356. Additionally, the temperature $T_{IN}$ of the first heat transfer fluid 342 entering the first heat exchanger 351 is greater than the temperature $T_{FIRST}$ of the cooling air flow 354 entering the air/fluid heat exchanger 352.

If the temperature Tour of the first heat transfer fluid 342 leaving the fluid/fluid heat exchanger 356, is less than the temperature $T_{SECOND}$ of the fluid flow 358 entering the fluid/fluid heat exchanger 356, then the first heat transfer fluid 342 only passes through the air/fluid heat exchanger 352 and then exits the first heat exchanger 351.

However, if the temperature Tour of the first heat transfer fluid 342 leaving the fluid/fluid heat exchanger 356, is greater than the temperature $T_{SECOND}$ of the fluid flow 358 entering the fluid/fluid heat exchanger 356, then the first heat transfer fluid 342 first passes through the air/fluid heat exchanger 352, then passes through the fluid/fluid heat exchanger 356, before then exiting the first heat exchanger 351.

FIG. 11(b) illustrates the condition where the temperature $T_{FIRST}$ of the cooling air flow 354 entering the air/fluid heat exchanger 352 is greater than the temperature $T_{SECOND}$ of the fluid flow 358 entering the fluid/fluid heat exchanger 356. Additionally, the temperature $T_{IN}$ of the first heat transfer fluid 342 entering the first heat exchanger 351 is less than the temperature $T_{FIRST}$ of the cooling air flow 354 entering the air/fluid heat exchanger 352.

In this set of conditions, the first heat transfer fluid 342 only passes through the fluid/fluid heat exchanger 356 and then exits the first heat exchanger 351.

Figure 12:
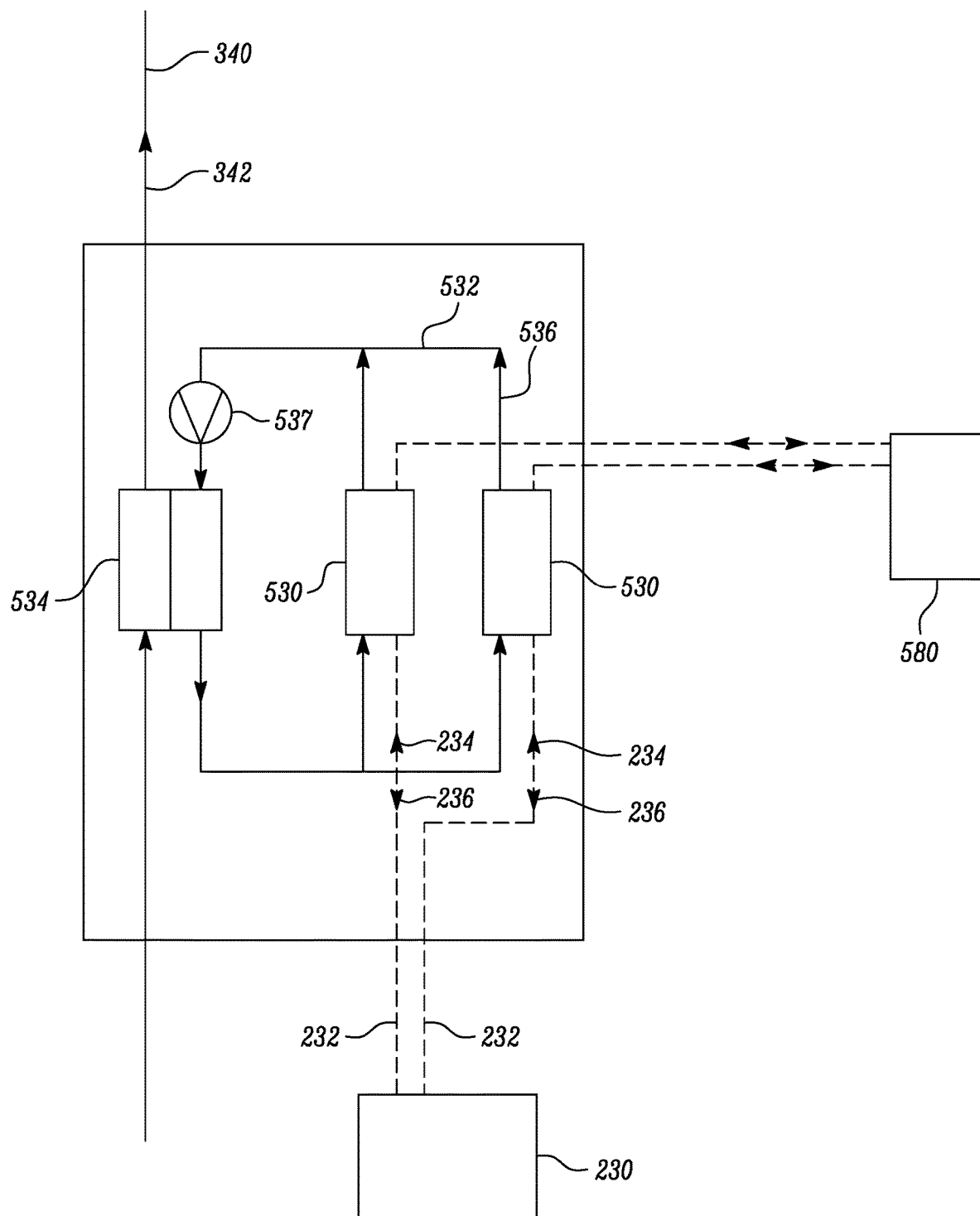
FIG. 12 shows a schematic diagram for an electric machine cooling loop for the thermal management systems of the disclosure.

FIG. 12 illustrates the cooling of the electric machine(s) 530. As mentioned earlier, the electric machine(s) 530 are rotatably coupled to the first gas turbine engine 100. This arrangement comprises a third thermal bus 532 in which a third heat transfer fluid 536 circulates in a closed-loop configuration through the or each electric machine 536 and through a third heat exchanger 534.

In this arrangement, the waste heat energy generated by the or each electric machine 530 is transferred firstly to the third heat transfer fluid 536, and then by the third heat exchanger 534 to the first heat transfer fluid 342 of the first thermal bus 340. The third heat transfer fluid 536 is circulated around the third thermal bus 532 by a pump 537.

The electric machines 530 being rotatably coupled to the first gas turbine engine 100 may be configured as a generator in which case they generate electrical energy that can be stored in an energy storage unit 230, or as a motor in which case the electrical energy stored in the energy storage unit 230 may power the electric machine 530. In both of these arrangements, the electric machines 530 are controlled by a controller 580.

In use, the first heat transfer fluid 342 is continuously circulated around the first thermal bus 340. In doing so, the first heat transfer fluid 342 collects waste heat energy from, in increasing order of temperature, the vapour compression system 380 (via the second heat exchanger 410), the first ancillary system(s) 370, the first electric machine(s) 330, and finally the gas turbine engine 100. In other words, waste heat energy is rejected from the gas turbine engine 100 at a higher temperature than the waste heat energy rejected by the electric machine(s) 330, which itself is rejected at a higher temperature than the waste heat energy rejected by the first ancillary system(s) 370, which itself rejected is at a higher temperature than the waste heat energy rejected by the vapour compression system 380.

Examples of the first ancillary system(s) 370 are the power converters for controlling the electric machine(s) 330, and the energy storage unit (or battery) 230.

In the present example, a temperature of the first heat transfer fluid 342 as it enters the first heat exchanger 351 is approximately 160° C. A temperature of the inlet air flow 354 as it enters the air/fluid heat exchanger 353 is approximately 32° C. This provides a value of a ratio between a temperature of the first heat transfer fluid 342, and a temperature of the inlet air flow 354 of approximately 5.0.

After collecting the waste heat energy from each of the vapour compression system 380, the first ancillary system(s) 370, the electric machine(s) 330, and the gas turbine engine 100, the first heat transfer fluid 342 then passes through the first heat exchanger 351. As outlined above, the first heat exchanger 351 comprises an air/fluid heat exchanger 353, a fluid/fluid heat exchanger 357, and a bypass valve 360.

The waste heat energy in the first heat transfer fluid 342 is then dissipated through either or both of the air/fluid heat exchanger 353, and fluid/fluid heat exchanger 357.

This first heat flow ($Q_1$) of waste heat energy generated by the heat sources (outlined in the previous paragraph) in the first thermal bus 340 is transferred via the first heat transfer fluid 342 to the air/fluid heat exchanger 353, and fluid/fluid heat exchanger 357.

In one arrangement, as previously explained, the selection of air/fluid heat exchanger 353, or fluid/fluid heat exchanger 357 for the dissipation of the waste heat energy from the first heat transfer fluid 342 is made on the basis of the airspeed of the aircraft 310.

When an airspeed of the aircraft is less than Mn0.6, the first heat exchanger 351 is configured to transfer the waste heat energy from the first heat transfer fluid 342 to the air/fluid heat exchanger 353. At an airspeed less than Mn0.6, the temperature of the inlet air flow 354 entering the gas turbine engine 100 is less than a temperature of the first heat transfer fluid 342 in the first thermal bus 340. Consequently, the waste heat energy in the first heat transfer fluid 342 can be effectively dissipated to the inlet air flow 354 before or as it enters the gas turbine engine 100.

When the airspeed of the aircraft is greater than Mn0.6, the first heat exchanger 351 is configured to transfer the waste heat energy from the first heat transfer fluid 342 to the fluid/fluid heat exchanger 357. At an airspeed of Mn0.6 it becomes likely that the temperature of an inlet air flow 354 entering the gas turbine engine 100 is close to or greater than a temperature of the first heat transfer fluid 342. Consequently, it may be difficult, if not impossible, to efficiently transfer the waste heat energy in the first heat transfer fluid 342 to the inlet air flow 354. In this situation, the waste heat energy in the first heat transfer fluid 342 can be effectively dissipated to the fuel flow 358 prior to being combusted in the gas turbine engine 100.

In an alternative embodiment of the disclosure, the airspeed at which the change from dissipation of the waste heat energy to the air/fluid heat exchanger 353, to dissipation of the waste heat energy to the fluid/fluid heat exchanger 357 may be one of Mn0.65, Mn0.70, Mn0.75 and Mn0.80.

In further alternative arrangements of the disclosure, the transition from dissipation of the waste heat energy to the air/fluid heat exchanger 353, to dissipation of the waste heat energy to the fluid/fluid heat exchanger 357 may be proportional rather than the step change outlined above.

In use, the vapour compression system 380 enables the first thermal bus 340 to be used to dissipate waste heat energy from the second ancillary system(s) 400 where this waste heat energy is generated at a lower temperature than that of the first thermal bus 340. The vapour compression system 380 raises the temperature of the waste heat energy generated by the second ancillary system(s) 400 to a temperature that is greater than that of the first heat transfer fluid 342 in the first thermal bus 340.

In one example of the present disclosure, the second ancillary system(s) generate a second heat flow ($Q_2$) of waste heat energy having a maximum value of approximately 260 kW at a temperature of approximately 60° C. Examples of the second ancillary system include environmental control units for the aircraft, data collection and analysis equipment, and audio and video communication equipment.

However, when the second ancillary system(s) are either not operating at peak load or not all operating together, then the waste heat energy generated by this reduced level of operation may be approximately 15 kW. Consequently, a ratio of a maximum waste heat energy generated by the or each second ancillary system to a minimum waste heat energy generated by the or each second ancillary system is 17.3.

The vapour compression system 380 receives the second heat flow ($Q_2$) of waste heat energy generated by the second ancillary system(s) 400, and in raising the temperature of this second heat flow ($Q_2$), also increases the quantity of waste heat energy, which now forms a third heat flow ($Q_3$) of waste heat energy in the second heat transfer fluid 420

(this is the refrigerant fluid) that is transferred via the second heat exchanger 410 to the first heat transfer fluid 342.

In the example provided above, the second heat flow ($Q_2$) of waste heat energy has a value of approximately 260 kW. After being raised in temperature by the vapour compression system 380, the corresponding third heat flow ($Q_3$) of waste heat energy has a value of approximately 510 KW. In other words, $Q_3=1.96*Q_2$.

Figure 13:
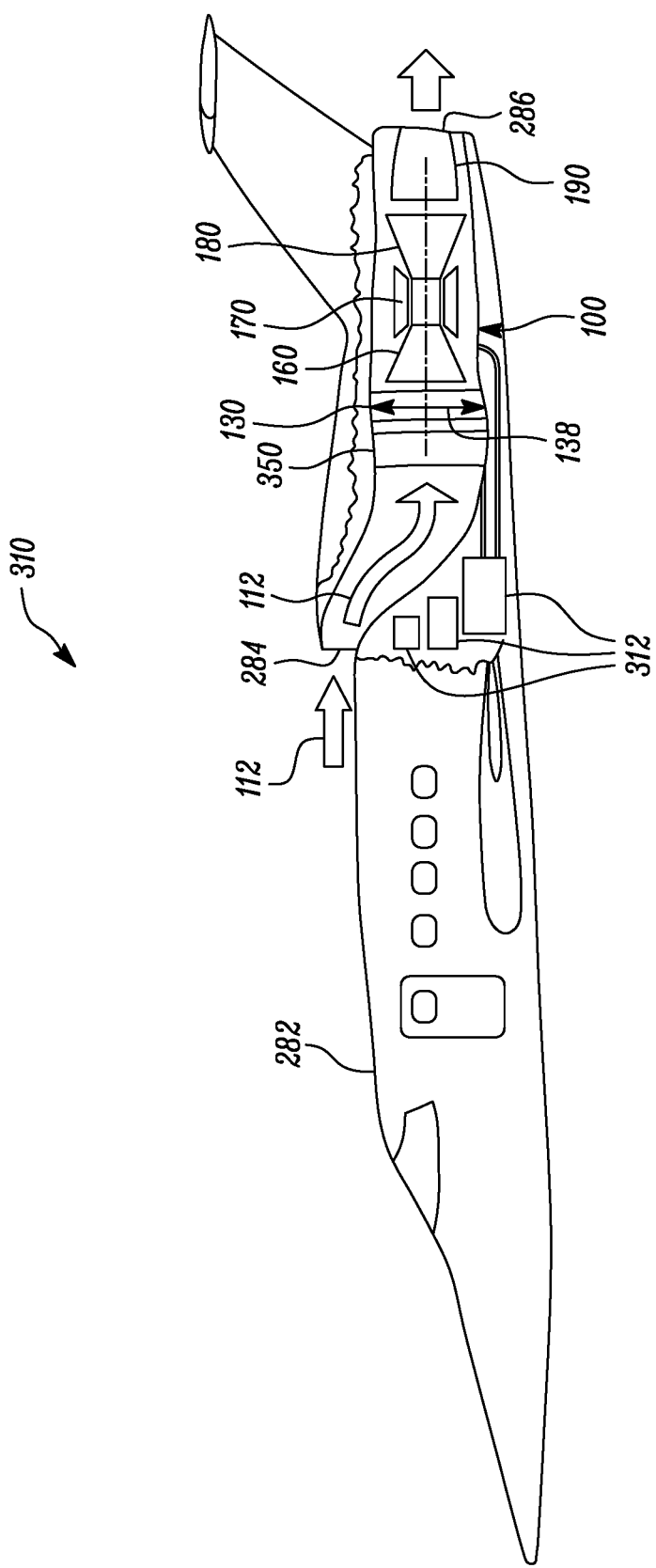
FIG. 13 shows a schematic cross-sectional view of an aircraft employing a thermal management system according to an embodiment of the disclosure.

Referring to FIG. 13, an aircraft according to an embodiment of the disclosure is designated by the reference numeral 310. The aircraft 310 comprises a machine body 282 in the form of a fuselage with wings and a tail plane. The machine body 282 encloses a turbofan gas turbine engine 100, together with a plurality of ancillary apparatus 312.

The machine body 282 comprises an inlet aperture 284 through which an inlet air flow 112 is drawn to feed the gas turbine engine 100. An exhaust flow exits the machine body 282 through an exhaust aperture 286.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

What is claimed is:

1. A thermal management system for an aircraft, the thermal management system comprising a first thermal bus, the first thermal bus comprising, in a closed loop flow sequence, one or more first heat sources, a heat sink, a vapour compression system, and one or more second heat sources, and
wherein the vapour compression system comprises, in closed loop flow sequence, a compressor, a condenser, a receiver, a first side of a recuperator, an expansion valve, an evaporator, a second side of the recuperator, and the compressor, each of the compressor and the expansion valve being controlled by a controller,
wherein the first thermal bus comprises a first heat transfer fluid, and a first heat flow ($Q_1$) of waste heat energy generated by the first heat sources is transferred via the first heat transfer fluid to the heat sink, and
wherein the vapour compression system comprises a refrigerant fluid, a second heat flow ($Q_2$) of waste heat energy generated by the or each second heat source is transferred via the evaporator to the refrigerant, and a third heat flow ($Q_3$) of heat energy in the refrigerant is transferred via the condenser to the first heat transfer fluid, and the controller is configured to ensure that:

$$1.1*Q_2<Q_3<3.0*Q_2.$$

2. The thermal management system as claimed in claim 1, wherein the first thermal bus is arranged in a recirculatory ring configuration with the first heat transfer fluid passing through each of a gas turbine engine, an electric machine, a first heat exchanger, and a first ancillary system.

3. The thermal management system as claimed in claim 1, wherein the thermal management system further comprises at least one electric machine rotatably coupled to a gas turbine engine, the first heat transfer fluid being in fluid communication between the gas turbine engine, the at least one electric machine, a first heat exchanger, and an ancillary system, such that waste heat energy generated by at least one of the gas turbine engine, the at least one electric machine, and the ancillary system, is transferred to the first heat transfer fluid.

4. The thermal management system as claimed in claim 1, wherein the heat sink comprises a first heat exchanger, and the system further comprises a gas turbine engine that comprises, in axial flow sequence, the first heat exchanger, a compressor module, a combustor module, and a turbine module, and a dissipation medium is an inlet air flow passing through the first heat exchanger and entering the compressor module.

5. The thermal management system as claimed in claim 1, wherein the heat sink comprises a first heat exchanger, and the system further comprises a gas turbine engine that comprises, in axial flow sequence, a compressor module, a combustor module, and a turbine module, and a dissipation medium is a fuel flow passing through the first heat exchanger and subsequently being directed to the combustor module.

6. The thermal management system as claimed in claim 1, wherein the vapour compression system further comprises, between the first side of the recuperator and the second side of the recuperator, two or more parallel flow lines with each flow line comprising, in axial flow sequence, an expansion valve and an evaporator, and wherein each evaporator is configured to transfer a heat flow ($Q_2$) of waste heat energy generated by a corresponding second heat source to the refrigerant.

7. The thermal management system as claimed in claim 1, wherein the system further comprises a gas turbine engine that is a turbofan gas turbine engine, the turbofan gas turbine engine comprising, in axial flow sequence, a fan module, a compressor module, a combustor module, and a turbine module, the fan module comprising at least one fan stage having a plurality of fan blades extending radially from a hub, the plurality of fan blades defining a fan diameter ($D_{FAN}$), and wherein the fan diameter $D_{FAN}$ is within a range of 0.3 m to 2.0 m.

8. The thermal management system as claimed in claim 7, wherein the turbofan gas turbine engine further comprises an outer casing, the outer casing enclosing the sequential arrangement of fan module, compressor module, and turbine module, an annular bypass duct being defined between the outer casing and the sequential arrangement of compressor module and turbine module, a bypass ratio being defined as a ratio of a mass air flow rate through the bypass duct to a mass air flow rate through the sequential arrangement of compressor module and turbine module, and wherein the bypass ratio is less than 4.0.

9. The thermal management system as claimed in claim 7, wherein the fan module has two or more fan stages, at least one of the fan stages comprising a plurality of fan blades defining the fan diameter $D_{FAN}$.

10. A method of operating a thermal management system for an aircraft, the thermal management system comprising a first thermal bus, the first thermal bus comprising, in a closed loop flow sequence, one or more first heat sources, a heat sink, a vapour compression system, and one or more second heat sources, the method comprising the steps of:
(i) providing the vapour compression system, the vapour compression system comprising, in closed loop flow sequence, a compressor, a condenser, a receiver, a first side of a recuperator, an expansion valve, an evaporator, a second side of the recuperator, and the compressor;
(ii) providing the vapour compression system with a refrigerant fluid;
(iii) providing a controller configured to control each of the compressor and the expansion valve;
(iv) transferring a first heat flow ($Q_1$) of waste heat energy generated by at least one of the first heat sources, to a heat transfer fluid;
(v) transferring a second heat flow ($Q_2$) of waste heat energy generated by the or each second heat source is transferred via the evaporator to the refrigerant
(vi) transferring a third heat flow ($Q_3$) of heat energy in the refrigerant generated by the or each second heat source is transferred via the condenser to the first-heat transfer fluid;
(vii) controlling each of the compressor and the expansion valve such that:

$$1.1*Q_2 < Q_3 < 3.0*Q_2; \text{ and}$$

(viii) transferring the waste heat energy from the first heat transfer fluid to the heat sink.

* * * * *